United States Patent [19]

Backes

[11] Patent Number: 5,336,982

[45] Date of Patent: Aug. 9, 1994

[54] DUAL-ARM GENERALIZED COMPLIANT MOTION WITH SHARED CONTROL

[75] Inventor: Paul G. Backes, La Crescenta, Calif.

[73] Assignee: The United States of America as represented by the Administrator of the National Aeronautics and Space Administration, Washington, D.C.

[21] Appl. No.: 34,608

[22] Filed: Mar. 24, 1993

[51] Int. Cl.$^5$ .............................................. G05B 19/18
[52] U.S. Cl. .......................... 318/568.22; 318/568.17; 901/15; 901/9
[58] Field of Search ...................... 318/568.11, 568.21, 318/568.22, 568.17; 901/9, 15

[56] References Cited

U.S. PATENT DOCUMENTS

| | | | |
|---|---|---|---|
| 3,890,552 | 6/1975 | Devol et al. | 318/568 |
| 4,756,662 | 7/1988 | Tanie et al. | 901/15 |
| 4,762,455 | 8/1988 | Coughlan et al. | 414/4 |
| 4,925,312 | 5/1990 | Onaga et al. | 318/568.22 |
| 4,964,062 | 10/1990 | Ubhayakar et al. | 364/513 |
| 4,974,210 | 11/1990 | Lee | 364/513 |
| 5,023,533 | 6/1991 | Ishikawa et al. | 318/568.21 |
| 5,023,808 | 6/1991 | Seraji | 364/513 |
| 5,031,441 | 6/1991 | Jones | 72/420 |
| 5,038,089 | 8/1991 | Szakaly | 318/568.11 |
| 5,039,254 | 8/1991 | Piercy | 405/191 |
| 5,072,361 | 12/1991 | Davis et al. | 318/568.17 |
| 5,086,262 | 2/1992 | Hariki et al. | 318/568 |
| 5,116,180 | 5/1992 | Fung et al. | 901/9 |

OTHER PUBLICATIONS

Paul G. Backes, Kam S. Tso, Thomas S. Lee, and Samad Hayati, "A Local-remote telerbot system for time-delayed traded and shared control," Proceedings 1991 ICAR: Fifth International Conference on Advanced Robotics, Robots in Unstructured Environments, pp. 243–248, Pisa, Italy, Jun. 19-22, 1991.

Samad Hayati, Thomas Lee, Kam Tso, Paul G. Backes and John Lloyd, "A unified teleoperated-autonomous dual-arm robotic system," IEEE Control Systems Magazine, 11(2):3-8, Feb. 1991.

P. Dauchez and M. Uchiyama, "Kinematic formulation for two forcecontrolled coopoerating robots," Proceedings Third International Conference on Advanced Robotics (ICAR), pp. 457–467, Versailles, France, Oct., 1987.

John T. Wen and Kenneth Kreutz, "Stability analysis of multiple rigid robot manipulators holding a common rigid object," Proceedings of the 27th Conference on Decision and Control; Austin, Texas, Dec. 1988.

(List continued on next page.)

Primary Examiner—William M. Shoop, Jr.
Assistant Examiner—John W. Cabeca
Attorney, Agent, or Firm—John H. Kusmiss; Thomas H. Jones; Guy M. Miller

[57] ABSTRACT

A multiple arm generalized compliant motion robot control system governs dual multi-joint robot arms handling an object with both of the arms in accordance with input parameters governing plural respective behaviors to be exhibited by the robot in respective behavior spaces simultaneously. A move-squeeze decomposition processor computes actual move and squeeze decomposition forces based upon current robot force sensor outputs. A compliant motion processor transforms plural object position perturbations of the plural behaviors from the respective behavior spaces to a common space, and computes a relative transformation to a behavior-commanded object position in accordance with the object position perturbations of the plural behaviors. A kinematics processor updates a transformation to a current commanded object position based upon the relative transformation to the behavior-commanded object position. A multiple arm squeeze control processor computes, from appropriate squeeze force input parameters and from actual squeeze forces for each of the arms, a squeeze control position perturbation for each of the arms, to provide squeeze control. An inverse kinematics processor computes, from the commanded object position transformation and from the squeeze control position perturbation, new robot joint angles, and controls respective joints of the robot arms in accordance with the new robot joint angles.

44 Claims, 16 Drawing Sheets

OTHER PUBLICATIONS

Yoshihiko Nakamura, Kiyoshi Nagai, and Tsuneo Yoshikawa, "Mechanics of coordinative manipulation by multiple robotic mechanisms," Proceedings IEEE International Conference on Robotics and Automation, 1987.

Masaru Uchiyama, Naotoshi Iwasawa, and Kyojiro Hakomori, "Hybrid position/force control for coordination of a two-arm robot," Proceedings IEEE International Conference on Robotics and Automation, pp. 1242–1247, 1987.

Masaru Uchiyama and Pierre Dauchez, "A symmetric hybrid position/force control scheme for the coordination of two robots," Proceedings IEEE International Conference on Robotics and Automation, 1988.

K. Kreutz and A. Lokshin, "Load balancing and closed-chain multiple arm control," Proceedings American Control Conference, pp. 2148–2154, Atlanta, Ga., Jun. 1988.

Ian Walker and Robert Freeman, "International object loading for multiple cooperating robot manipulators," Proceedings IEEE International Conference on Robotics and Automation, pp. 606–611, 1989.

Y. F. Zheng and J. Y. S. Luh, "Joint torques for control of two coordinated moving robots," Proceedings IEEE International Conference on Robotics and Automation, 1986.

J. Y. S. Luh and Y. F. Zheng, "Contrained relations between two coordinated industrial robots for motion control," International Journal of Robotics Research, 6(3):60–70, Fall 1987.

Paul G. Backes, "Generalized compliant motion task description and execution within a complete telerobotic system," Proceedings IEEE International Conference on Systems Engineering, Aug. 9–11, 1990.

Paul G. Backes, "Generalized complaint motion with sensor fusion," Proceedings 1991 ICAR: Fifth International Conference on Advanced Robotics, Robots in Unstructured Environments, pp. 1281–1286, Pisa, Italy, Jun. 19–22, 1991.

Paul G. Backes and Kam S. Tso, "Umi: An interactive supervisory and shared control system for telerobitics," Proceedings IEEE International Conference on Robotics and Automation, 1990.

Paul G. Backes, Mark K. Long, and Robert D. Steele, "Designing minimal space telerobotics systems for maximum performance," Proceedings AIAA Aerospace Design Conference, Irvine, Calif. Feb. 3–6, 1992.

DUAL-ARM GENERALIZED COMPLIANT MOTION WITH SHARED CONTROL

BACKGROUND OF THE INVENTION

Origin of the Invention

The invention described herein was made in the performance of work under a NASA contract, and is subject to the provisions of Public Law 96-517 (35 USC 202) in which the contractor has elected not to retain title.

Technical Field

The invention relates to dual arm robot control systems and in particular to systems for controlling robots grasping a single object between two arms for performing specific tasks in response to multiple user or sensor inputs.

Background Art

Multiple-arm robotic systems provide many valuable capabilities beyond single-arm systems. Coordinated control of multiple robots allows one robot to act as a flexible fixturing device while another robot executes a task. Cooperative control of multiple robots allows multiple robots to cooperatively execute a task with common closed chain control. This may be valuable when handling heavy or extended objects or objects which are difficult to grasp securely with one arm.

The invention described in this specification was motivated by the needs and constraints of space telerobotics. Dual-arm cooperative control may be valuable for manipulation objects which are extended or have large mass relative to the manipulators. Also, tasks involving relatively small objects may also be more effectively executed using cooperative dual-arm control, as has been demonstrated using the methods described in this specification for the fluid coupler mating task of satellite servicing. There are many constraints for a space telerobotics control system such as limited computational power, relatively fixed remote site software environment, and safety concerns.

References

The invention will be described below with reference to the following publications by number in square brackets, as in "[1]":

[1.] Paul G. Backes, Kam S. Tso, Thomas S. Lee, and Samad Hayati, "A Local-remote telerobot system for time-delayed traded and shared control," Proceedings 1991 ICAR: Fifth International Conference on Advanced Robotics, Robots in Unstructured Environments, pages 243-248, Pisa, Italy, Jun. 19-22, 1991.

[2.] Samad Hayati, Thomas Lee, Kam Tso, Paul G. Backes, and John Lloyd, "A unified teleoperated-autonomous dual-arm robotic system," IEEE Control Systems Magazine, 11(2):3-8, February 1991.

[3.] Paul G. Backes and Kam S. Tso, "Umi: All interactive supervisory and shared control system for telerobotics," Proceedings IEEE International Conference on Robotics and Automation, 1990.

[4.] P. Dauchez and M. Uchiyama, "Kinematic formulation for two forcecontrolled cooperating robots," Proceedings Third International Conference on Advanced Robotics (ICAR), pages 457-467, Versailles, France, October 1987.

[5.] John T. Wen and Kenneth Kreutz, "Stability analysis of multiple rigid robot manipulators holding a common rigid object," Proceedings of the 27th Conference on Decision and Control, Austin, Tex., December 1988.

[6.] Yoshihiko Nakamura, Kiyoshi Nagai, and Tsuneo Yoshikawa, "Mechanics of coordinative manipulation by multiple robotic mechanisms," Proceedings IEEE International Conference on Robotics and Automation, 1987.

[7.] Masaru Uchiyama, Naotoshi Iwasawa, and Kyojiro Hakomori, "Hybrid position/force control for coordination of a two-arm robot," Proceedings IEEE International Conference on Robotics and Automation, pages 1242-1247, 1987.

[8.] Masaru Uchiyama and Pierre Dauchez, "A symmetric hybrid position/force control scheme for the coordination of two robots," Proceedings IEEE International Conference on Robotics and Automation, 1988.

[9.] K. Kreutz and A. Lokshin, "Load balancing and closed-chain multiple arm control," Proceedings American Control Conference, pages 2148-2154, Atlanta, Ga., June 1988.

[10.] Ian Walker and Robert Freeman, "International object loading for multiple cooperating robot manipulators," Proceedings IEEE International Conference on Robotics and Automation, pages 606-611, 1989.

[11.] Y. F. Zheng and J. Y. S. Luh, "Joint torques for control of two coordinated moving robots," Proceedings IEEE International Conference on Robotics and Automation, 1986.

[12.] J. Y. S. Luh and Y. F. Zheng, "Constrained relations between two coordinated industrial robots for motion control," International Journal of Robotics Research, 6(3):60-70, Fall 1987.

[13.] Paul G. Backes, "Generalized compliant motion task description and execution within a complete telerobotic system," Proceedings IEEE International Conference on Systems Engineering, Aug. 9-11, 1990.

[14.] Paul G. Backes, "Generalized compliant motion with sensor fusion," Proceedings 1991 ICAR: Fifth International Conference on Advanced Robotics, Robots in Unstructured Environments, pages 1281-1286, Pisa, Italy, Jun. 19-22, 1991.

[15.] Paul G. Backes, Mark K. Long, and Robert D. Steele, "Designing minimal space telerobotics systems for maximum performance," Proceedings AIAA Aerospace Design Conference, Irvine, Calif., Feb. 3-6, 1992.

SUMMARY OF THE DISCLOSURE

A dual-arm task execution primitive is provided for cooperative dual-arm telerobotic task execution utilizing multiple sensors concurrently. The primitive has been integrated into a telerobot task execution system and can be called by a task planning system for execution of tasks requiring dual-arm sensor based motion, e.g., force control, teleoperation and shared control. The primitive has a large input parameter set which is used to specify the desired behavior of the motion. Move-squeeze decomposition is utilized to decompose forces sensed at the wrists of the two manipulators into forces in the move subspace, which cause system motion, and forces in the squeeze subspace, which cause internal forces. The move and squeeze forces are then separately controlled. Several space servicing tasks utilizing the cooperative dual-arm control capability are described and experimental results from the tasks are given. The supervisory and shared control tasks include capture of a rotating satellite, orbital replacement unit changeout, fluid coupler seating and locking, and contour following.

The invention includes a unified control algorithm integrating cooperative dual-arm control with multi-sensor based task control. The invention employs various methods for cooperative dual-arm control, multi-sensor based control, task execution, task description and safety monitoring. The complete control capability is made available to a higher level task planning system as a task execution primitive with a large input parameter set which is used to describe the desired behavior of motion. The task primitive, called the Dual-Arm Generalized Compliant Motion (DAGCM) primitive, provides autonomous, teleoperation, and shared control capability of task execution as specified for the common object held by the two manipulators. Separate parameterization are used to describe the control in the move and squeeze subspaces. A single-arm version of the primitive has been integrated into the local-remote telerobot system in the JPL Supervisory Telerobotics (STELER) Laboratory [1,2]. The autonomous, teleoperation, and shared control capabilities are provided to an operator using the User Macro Interface [3]. Several space servicing tasks utilizing the primitive are described and experimental results from the tasks are given.

In accordance with the invention, a multiple arm generalized compliant motion robot control system governs dual multi-joint robot arms handling an object with both of the arms. Initially, plural input parameters are defined as governing plural respective behaviors to be exhibited by the robot in respective behavior spaces simultaneously. Kinematic quantities such as position and force are defined as six-vectors, wherein "force" includes a three-vector force and a three-vector torque and "position" includes a three-vector location and a three-vector rotation orientation. A move-squeeze decomposition processor computes actual move and squeeze decomposition forces based upon current robot force sensor outputs. A compliant motion processor transforms plural object position perturbations of the plural behaviors from the respective behavior spaces to a common space, and computes a relative transformation to a behavior-commanded object position in accordance with the object position perturbations of the plural behaviors. A kinematics processor updates a transformation to a current commanded object position based upon the relative transformation to the behavior-commanded object position. A multiple arm squeeze control processor computes, from appropriate squeeze force input parameters and from actual squeeze forces for each of the arms, a squeeze control position perturbation for each of the arms, to provide squeeze control. An inverse kinematics processor computes, from the commanded object position transformation and from the squeeze control position perturbation, new robot joint angles, and controls respective joints of the robot arms in accordance with the new robot joint angles.

The plurality of input parameters can include Cartesian stiffness parameters, force setpoints, joint limits, joint singularities, dither wave parameters, teleoperation input frame of reference and a Cartesian trajectory. The plurality of behaviors can include Cartesian stiffness control, force control, joint limit avoidance, joint singularity avoidance, dither wave motion, teleoperation control and Cartesian trajectory control. The compliant motion processor computes the behavior-commanded object position by first computing the position perturbations for all of the plural behaviors and then combining all of the position perturbations.

Where one of the behaviors includes Cartesian trajectory control, the system further includes a trajectory processor which computes a drive transformation to a relative object position in accordance with Cartesian trajectory input parameters, in which case the kinematics processor updates the transformation to a current commanded object position based upon the relative transformation to the behavior-commanded object position and based upon the drive transformation each sampling interval. The drive transformation is computed in accordance with input parameters specifying initial and destination object positions and in accordance with the number of elapsed sampling intervals.

Where one of the input parameters includes move force set points, the compliant motion processor computes a position perturbation of the object in accordance with a product of a force control constant and a difference between the move force set points and the actual move forces. Where the input parameters include joint angle limits and joint angle singularities for individual joints on the arms, the compliant motion processor computes for each of the arms a position perturbation of the object in accordance with a product of a force field constant and a reciprocal of a difference between actual joint angles sensed by joint angle sensors on the arms and corresponding ones of the joint angle limits and joint angle singularities.

The various input parameters such as joint angle limits, joint angle singularities and the force set points are comprised within a generalized compliant motion primitive of user-specified input parameters. The new robot joint angles are computed repetitively in successive sampling intervals and the input parameters are changeable each sampling interval so that the plural behaviors are dynamically programmable.

Where behaviors comprise safety monitoring or termination condition monitoring, the system stops motion of the robot in response to predetermined quantities measured by sensors on the robot reaching certain values specified by corresponding ones of the input parameters.

DETAILED DESCRIPTION OF THE PREFERRED EMBODIMENT

I. Nomenclature

The invention will be described in detail below with reference to the following definitions of nomenclature including nomenclature for transforms and coordinate frames.

Coordinate frames

BASEL = base of left robot
BASER = base of right robot
DITHER = D = dither task frame
FORCE = F = force control task frame
GRL = point where left arm grasps object and left squeeze forces are controlled
GRR = point where right arm grasps object and right squeeze forces are controlled
MERGE = M = actual position of common object
OBJDEST = a priori destination of common object
OBJINIT = initial position of common object
OBJPT = position of common object due to trajectory generator
PTL = position of GRL after squeeze control perturbation
PTR = position of GRR after squeeze control perturbation
TELEOP = T = teleoperation task frame
TNL = attached to terminal link of left robot
TNR = attached to terminal link of right robot
WORLD = common frame for specifying position of robot base frames and common object position Transformations:

$\text{trBaseL} = {}^{WORLD}_{BASEL}T$ $\text{trBaseR} = {}^{WORLD}_{BASER}T$ $\text{trDither} = {}^{MERGE}_{DITHER}T$ $\text{trDrive} = {}^{OBJDEST}_{OBJPT}T$ = trajectory generator motion $\text{trForce} = {}^{MERGE}_{FORCE}T$ $\text{trGrL} = {}^{TNL}_{GRL}T$ $\text{trGrR} = {}^{TNR}_{GRR}T$ -continued $\text{trLObj} = {}^{PTL}_{MERGE}T$ = transform from left grasp point of object to object motion frame $\text{trObj} = {}^{OBJINIT}_{MERGE}T$ = motion of the object from its initial position $\text{trObjDest} = {}^{WORLD}_{OBJDEST}T$ $\text{trObjInit} = {}^{WORLD}_{OBJINIT}T$ $\text{trPtL} = {}^{GRL}_{PTL}T$ = left arm squeeze control motion $\text{trPtObj} = {}^{MERGE}_{OBJPT}T$ = all sensor based motion $\text{trPtR} = {}^{GRR}_{PTR}T$ = right arm squeeze control motion $\text{trRObj} = {}^{PTR}_{MERGE}T$ = transform from right grasp point of object to object motion frame $\text{trTeleop} = {}^{MERGE}_{TELEOP}T$ $\text{trTnL} = {}^{BASEL}_{TNL}T$ $\text{trTnR} = {}^{BASER}_{TNR}T$ Subscripts:
a = actual
d = dither
f = force
j = joint
p = perturbation
r = reference
t = teleoperation

II. Input Parameter Set

Figure 2:
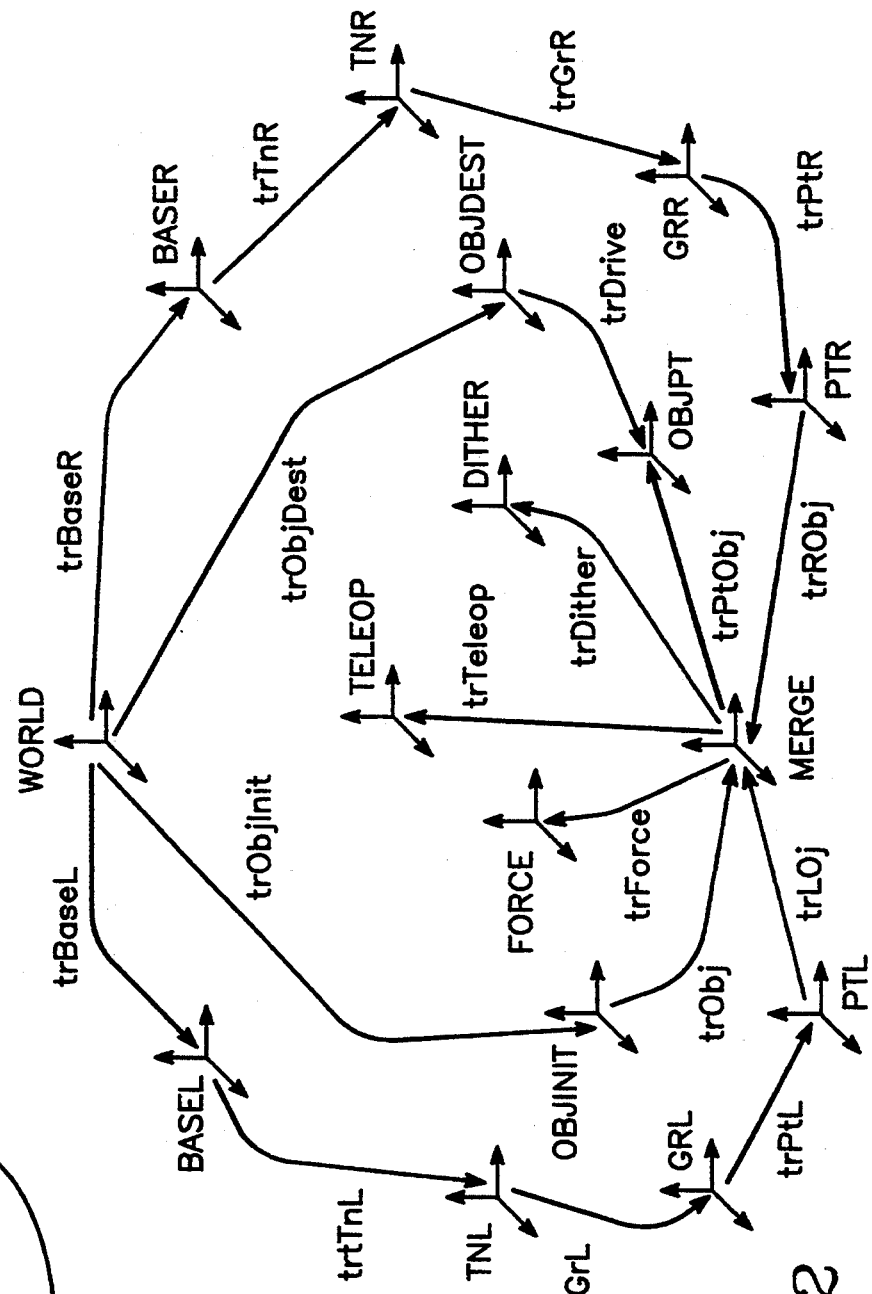
FIG. 2 is a kinematic diagram illustrating the hierarchy of coordinate transformations employed in carrying out the invention.

The Dual-Arm Generalized Compliant Motion (DAGCM) primitive provides multi-sensor based dual-arm cooperative control task execution for a higher level planning system. The higher level system describes the desired behavior of control via an input parameter set. The input parameter set is sufficiently general (as is the primitive) to specify a wide variety of supervisory and shared control tasks. The input parameter set is given below. FIG. 2 illustrates the hierarch of coordinate transforms and coordinate frame definitions employed herein.

System Parameters period: period to report status to higher level system
trRObj: transform from right grasp frame to MERGE frame
trBaseR: transform from WORLD to BASER frame
trBaseL: transform from WORLD to BASEL frame
massPropR: object mass properties felt by right arm
massPropL: object mass properties felt by left arm Trajectory Parameters trTnDest: transform from BASER frame to destination right arm TNR frame
timeSpeed: selects time or velocity based nominal motion
segVal: time or velocity to execute nominal motion
cAcc: maximum Cartesian acceleration of nominal motion Contact Force Control Parameters trForce: transform from MERGE frame to FORCE frame
cfSelVect: hybrid selection vector for FORCE frame
cfComplyVect: selection vector specifying which position DOFs of FORCE frame also have compliance cfFtSetpoints: force setpoints in force controlled DOFs of FORCE frame
cfFtGains: force gains in FORCE frame
cfMaxFcVel: maximum velocities in DOFs of FORCE frame due to force control Teleoperation Control Parameters whichHC: which hard controller to use (right or left)
teleMode: which teleoperation mode: tool, world, or camera
trCamera: transform from WORLD frame to camera TN frame
trTeleop: transform from MERGE frame to TELEOP frame
tpSelVect: selection vector for shared control
teleWeights: weightings for teleop inputs
tpMaxVel: max velocity due to teleoperation inputs Dither Control Parameters trDither: transform from MERGE frame to DITHER frame
dtWaveMag: magnitudes of dither functions
dtPeriod: periods of dither functions Joint Limit and Joint Singularity Avoidance jaGain: gain for joint limit and singularity avoidance
jaThres: threshold from joint limit or singularity Stiffness Control Parameters spSelVect: degrees of freedom in which to apply springs
spGains: spring gains
spMaxVel: max velocity due to springs Squeeze Force Control Parameters (specified separately for both right and left arms)

trGrL, trGrR: transform from TN frame to GR frame
sqForceSpL, sqForceSpR: squeeze forces set points in GRR and GRL frames
sqFtGainsL, sqFtGainsR: force control gains for each axis of squeeze control
sqMaxVelL, sqMaxVelR: max velocity due to squeeze force control
sqSpGainsL, sqSpGainsR: squeeze spring gains Control Monitor Parameters ctFThres: contact force threshold
ctTThres: contact torque threshold
sqRFThres: right squeeze force threshold
sqRTThres: right squeeze torque threshold
sqLFThres: left squeeze force threshold
sqLTThres: left squeeze torque threshold Fusion Monitor Parameters fsPThres: position threshold for sensor based motion
fsOThres: orientation threshold for sensor based motion Joint Monitor Parameters jSafetyLim: joint safety limits from singularities and joint limits Termination Condition Monitor Parameters select: bit mask to select which ending conditions to test for
testTime: time over which to average ending condition variables
endTime: maximum ending motion time
endTransDel: total translation due to sensor based motion in MERGE frame
endAngDel: total angular motion due to sensor based motion in MERGE frame
endTransVel: magnitude of rate of change of endTransDel
endAngVel: magnitude of rate of change of endAngDel
endForceErr: contact force error vector magnitude
endTorqueErr: contact torque error vector magnitude
endForceVel: magnitude of rate of change of endForceErr
endTorqueVel: magnitude of rate of change of endTorqueErr III. Move-Squeeze Decomposition Multiple arms holding an object can apply both forces which cause motion of the object and forces which cause internal forces to build up within the object without motion. The former are called external or move forces and the later are called internal or squeeze forces [4,5]. Throughout this specification, "position" will refer to both location and orientation, and "force" will refer to both force and moment. Execution of a dual-arm task requires the control of both of these force subspaces. Description of the desired contact interaction between the commonly held object and its environment requires description of the desired move subspace forces. Description of the desired internal object forces requires description of the squeeze subspace forces.

Decomposition of the forces applied by multiple robots on an object into move and squeeze subspace components was originally described in [4] and subsequently by various authors [5–10]. An earlier method for cooperative motion of two manipulators was "follow the leader" where the motion of the leader manipulator was planned and the motion of the follower manipulator was determined based upon the motion of the leader [11,12]. The move-squeeze decomposition used here follows the method described in [4]. It is assumed that the arms and the commonly held object are rigid and the grasps between the arms and object are rigid.

Figure 1:
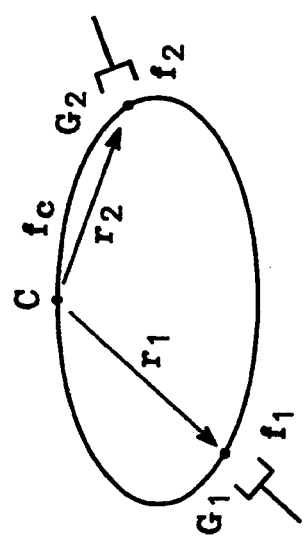
FIG. 1 is a diagram of the vectors employed herein pertaining to two robots holding a common object.

Two robots holding a common object are depicted in FIG. 1. One robot grasps the object at location $G_1$ and a second robot grasps the object at location $G_2$. A third point on the object, C, is the location of potential contact with the environment. The two arms exert forces and torques on the object, $F_1$, $N_1$ and $F_2$, $N_2$, which are combined in the vectors $f_1$ and $f_2$, i.e., $$f_1 = \begin{bmatrix} N_1 \\ F_1 \end{bmatrix} \quad f_2 = \begin{bmatrix} N_2 \\ F_2 \end{bmatrix}$$

The vector of forces at C is then $$f_c = \Phi_{c,1} \cdot f_1 + \Phi_{c,2} \cdot f_2 \tag{1}$$

$$= [\Phi_{c,1}, \Phi_{c,2}] \cdot \begin{bmatrix} f_1 \\ f_2 \end{bmatrix}$$

$$= A^T \cdot f_{12}$$

where $$A^T = [\Phi_{c,1}, \Phi_{c,2}] \tag{2}$$

$$f_{12} = \begin{bmatrix} f_1 \\ f_2 \end{bmatrix} \tag{3}$$

$$\Phi_{c,i} = \begin{bmatrix} I & r_i \\ 0 & I \end{bmatrix} \tag{4}$$

$$r_i = \begin{bmatrix} 0 & -r_{iz} & r_{iy} \\ r_{iz} & 0 & -r_{ix} \\ -r_{iy} & r_{ix} & 0 \end{bmatrix} \tag{5}$$

The vectors $r_1$ and $r_2$ in FIG. 2 are $$r_1 = \begin{bmatrix} r_{1x} \\ r_{1y} \\ r_{1z} \end{bmatrix} \quad r_2 = \begin{bmatrix} r_{2x} \\ r_{2y} \\ r_{2z} \end{bmatrix}$$

The components of the force vector $f_{12}$ which are in the nullspace of $A^T$ comprise the squeeze forces [4], $f_{12s}$, and the components of $f_{12}$ which are in the vector space of $A^T$ comprise the move forces, $f_{12m}$, i.e., $$f_{12} = f_{12s} + f_{12m} \tag{6}$$

The move forces are computed using the Moore-Penrose inverse of $A^T$, i.e., $$f_{12m}A^{+T} \cdot f_c = A \cdot (A^T \cdot A)^{-1} \cdot A^T \cdot f_{12} \tag{7}$$

The force vector $f_{12}$ is known by measurement with wrist force-torque sensors. The squeeze forces are then computed with $$f_{12s} = f_{12} - f_{12m} \tag{8}$$

The move and squeeze forces (and torques) for the two manipulators are then extracted from $f_{12m}$ and $f_{12s}$ $$\begin{aligned} f_{12m} &= [N_{1m}, F_{1m}, N_{2m}, F_{2m}]^T \\ f_{12s} &= [N_{1s}, F_{1s}, N_{2s}, F_{2s}]^T \end{aligned} \tag{9}$$

The actual move and squeeze forces are then available for use in control. The mass properties of the common object, as felt by each arm, are given in the massPropR and massPropL input parameters. The gravity forces of the composite object beyond the force sensors are computed and subtracted from the measured $f_{12}$ before move-squeeze decomposition is computed.

IV. Kinematic Relationships And Nominal Motion

The kinematic relationships in DAGCM between the two manipulators, the common object, and the various motion sources are shown in FIG. 2, showing the various coordinate frames and the transformations between them (defined in the Nomenclature above). Kinematic ring equations are used to describe the motion of the common object, the two arms and the relationships between them. The kinematic ring equations for the common object, right arm, and left arm are $$trObjInit \cdot trObj \cdot trPtObj = trObjDest \cdot trDrive \tag{10}$$

$$trBaseL \cdot trTnL \cdot trGrL \cdot trPtL \cdot trLObj = trObjInit \cdot trObj \tag{11}$$

$$trBaseR \cdot trTnR \cdot trGrR \cdot trPtR \cdot trRObj = trObjInit \cdot trObj \tag{12}$$

Figure 3:
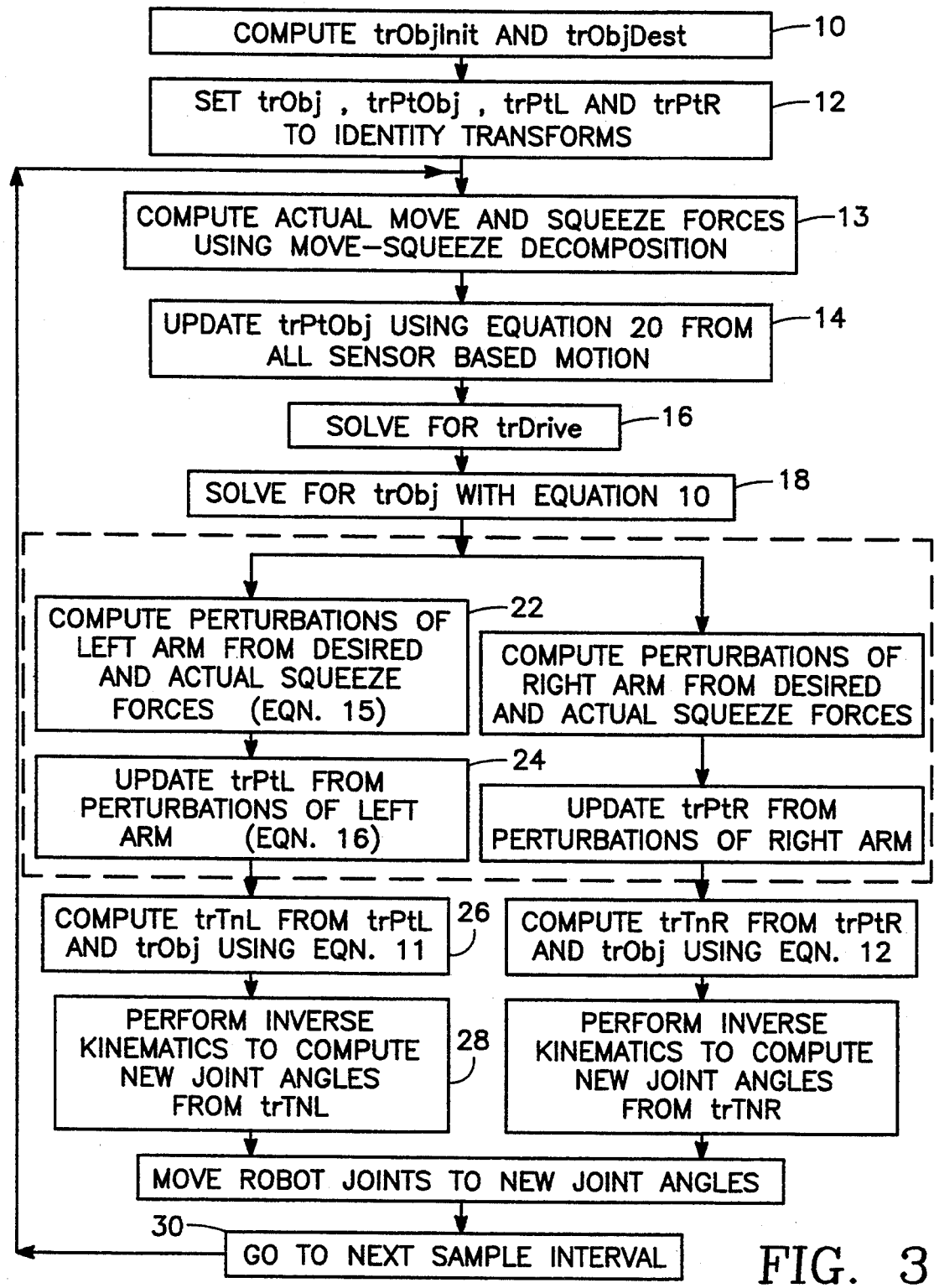
FIG. 3 is a block flow diagram illustrating a control process of the invention.

The motion of the object is computed independently of the motion of the manipulators, except to compute the initial position. The entire process is illustrated in FIG. 3. In Equation 10, trObjInit and trObjDest are constant transforms which must be computed or provided initially, as in block 10 of FIG. 3. trObjInit is computed from the known initial position of the right robot, $trTnR_{init}$, and the input parameters trBaseR, trGrR and trRObj.

$$trObjInit = trBaseR \cdot trTnR_{init} \cdot trGrR \cdot trRObj \tag{13}$$

trObjDest is computed from input parameters.

$$trObjDest = trBaseR \cdot trTnDest \cdot trGrR \cdot trRObj \tag{14}$$

Alternatively, trObjInit and trObjDest could have been given as input parameters.

The transforms trObj, trPtObj, trPtL and trPtR are all initially the identity transform, as in block 12 of FIG. 3. They are then updated each sample interval. In block 13 of FIG. 3, move-squeeze decomposition described in Section 3 hereof is used to compute the actual squeeze forces (as well as the actual move forces). The updating of trPtObj corresponds to block 14 of FIG. 3.

The trDrive transform generates the reference trajectory and is interpolated, as in block 16 of FIG. 3, from an initial value which solves Equation 10 with trObj and trPtObj both the identity transform to a final value, namely the identity transform. The Cartesian interpolation is described by the input parameters timeSpeed, segVal and cAcc. Initially, the trDrive transform is the transformation between the initial and destination object positions, and incrementally approaches the identity transform as the object approaches the destination point each sampling interval. Each incremental change is thus interpolated based upon the foregoing input parameters.

The trPtObj transform is updated each sample interval in block 14 of FIG. 3 with the integration of all sensor based motion as described in Section VI below with reference to FIG. 4. After trDrive and trPtObj are computed, the trObj transform is computed using Equation 10, as in block 18 of FIG. 3. trObj is then used in the left and right robot ring equations to compute their new positions, corresponding to the steps of blocks 22 through 26 of FIG. 3 for the left arm, as will now be described.

The motion of the left and right robots are treated equally, each dependent on the motion of the common object and the input parameters. In Equation 11, the trBaseL, trGrL and trLObj transforms are constant and given in the input parameters. Each sample interval the trPtL transform is computed by squeeze control as described in Section V below, and then trTnL is computed using Equation 11. Computations for the right robot are equivalent to the left except for variations due to different input parameters. Once trTnL and trTnR are computed each sample interval, they are used in inverse kinematics for each arm to compute the equivalent joint angles for the robots. Joint position servos then drive the joints to the new computed angles.

V. Squeeze Control

Squeeze control is used to compute trPtR and trPtL of Equations 11 and 12. This portion of the process is illustrated in FIG. 3 as two parallel branches involving identical steps, one for the right arm and one for the left arm. Both branches will be described principally with reference to the left arm. In each sample interval move-squeeze decomposition, as explained in Section III, is used to compute the squeeze forces (as well as move forces) in the GRL and GRR coordinate frames beginning with the step of block 13 of FIG. 3. Either or both of the robots can be controlled to track the desired squeeze force with the choice specified by the input parameter set. Squeeze control will be described for only the left arm here although it is equivalent for the right arm. In the step of block 22 of FIG. 3, at each sample interval the vector of six perturbations along and about the axes of the GRL frame is computed with $$\delta X_{lsq} = K_{lsq}(f_{lsqr} - f_{lsqa}) \quad (15)$$

where $K_{lsq}$ is the diagonal matrix of gains given in the input vector sqFtGainsL, $f_{lsqr}$ are the desired (reference) squeeze forces given in the sqForceSpL vector of input parameters and $f_{lsqa}$ are the measured actual squeeze forces computed in move-squeeze decomposition of the previous step of block 13 of FIG. 3. The sqMaxVel vector input parameter is then used to limit the magnitude of the pertubations in the vector $\delta X_{lsq}$. In the next step of block 24 of FIG. 3, the trPtL transform is updated with the new perturbations with $$trPtL = trDel_{lsq} trPtL \quad (16)$$

where $trDel_{lsq}$ is generated from $\delta X_{lsq}$ as explained in the following paragraph.

Given a vector of small perturbations, $\delta X$, where $$\delta X = [dx, dy, dz, \delta\alpha, \delta\beta, \delta\gamma]^T$$

a perturbation transform can be generated with $$trDel_{\delta X} = trans(x,dx) \cdot trans(y,dy) \cdot trans(z,dz) \cdot rot(x,\delta\alpha) \cdot rot(y,\delta\beta) \cdot rot(z,\delta\gamma)$$

where trans(v,d) is a translation of d along the v axis and rot(v,δ) is a rotation of δ about the v axis. The order of transform multiplication does not matter since the perturbations are assumed small.

In the step of block 26 of FIG. 3, the system computes trTnL from trPtL using Equation 11. In the step of block 28 of FIG. 3, inverse kinematics are employed to compute new joint angles from the updated trTnL transform. A parallel sequence of steps is performed for the right arm, as illustrated in FIG. 3. Both robot arm joints are then moved accordingly. Then, the system goes to the next sampling interval at block 30 of FIG. 3 and the entire process is restarted at the step of block 14.

VI. Generalized Compliant Motion

Generalized compliant motion is used here to control the motion of the common object based upon the trajectory generator, force control of the move forces from move-squeeze decomposition, and motion based upon several other sensors. As used herein, the term "sensor" is very general and refers to such motion control sources as telerobotic user hand controls, as one example. Generalized compliant motion is a control algorithm which allows multiple sensor based control for task execution [13,14]. The sensors can be either real, e.g., a force-torque sensor, or virtual, e.g., a computed distance to collision. Each sensor is provided an individual task space for control and the resulting motion commanded by each sensor is merged in a common frame MERGE.

Figure 4A:
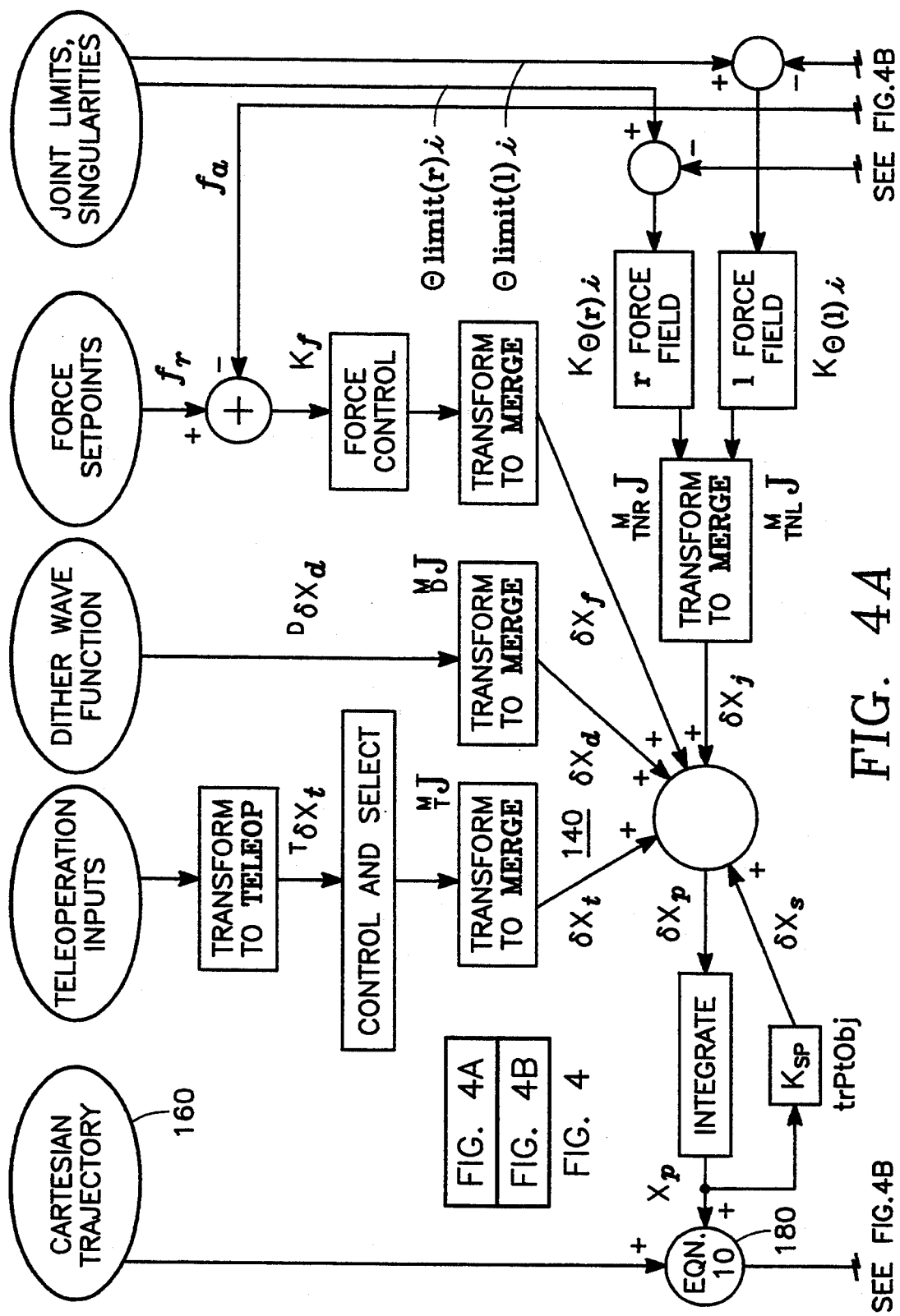
FIG. 4 is divided into two parts labelled FIG. 4A and
FIG. 4B together comprising a schematic block diagram of a dual arm control system embodying the invention.
Figure 4B:
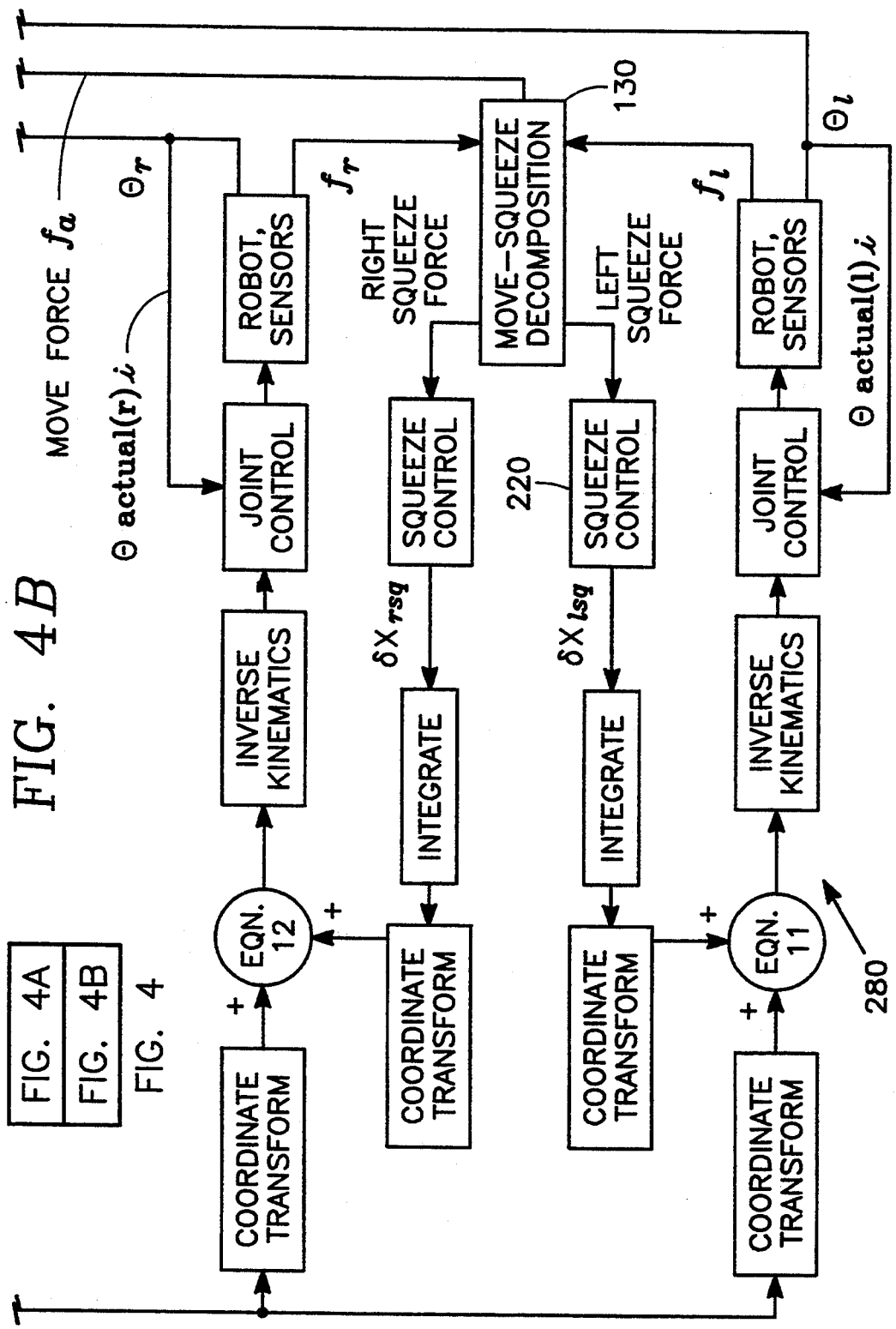

A block diagram for DAGCM is given in FIG. 4. Each sensor generates a desired perturbation for the object in the sensor frame's individual task frame. This perturbation is then transformed to an equivalent perturbation of the common MERGE frame assuming the sensor task frame and MERGE frame are connected by a rigid body. The commanded perturbation of the MERGE frame for a sample interval due to all sensor based motion is then $$\delta X_p = -K_{sp} \cdot X_p + {}_F{}^M J \cdot K_f \cdot (f_r - f_a) + {}_T{}^M J \cdot {}^T \delta X_t + {}_D{}^M J \cdot {}_B \delta X_d + {}^M \delta X_j \quad (17)$$

The Jacobians used in Equation 17 relate Cartesian perturbations at two different frames attached to the same rigid body, e.g., ${}_F{}^M J$ transforms perturbations in the F frame to equivalent perturbations in the M frame. Throughout this specification, a preceding subscript indicates the frame that the quantity is transformed from and a preceding superscript indicates the frame that the quantity is transformed to.

The first term in Equation 17 is the stiffness term. The matrix of gains $K_{sp}$ is a diagonal matrix of the input vector parameters spGains and $X_p$ represents the accumulated motion due to sensor based control which is stored in trPtObj. Additionally, the spSelVect input vector selects which degrees of freedom in the MERGE frame to apply stiffness and the spMaxVel input vector specifies the maximum velocity for motion due to stiffness. Equation 17 represents the computations in matrix/vector form for the six degrees of freedom. However, in implementation for a single arm robot the three orientation degrees of freedom were treated as one rotation about an equivalent axis of rotation [14]. The perturbation transform due to stiffness, ${}^M trDel_s$, is then computed from the stiffness perturbations.

The second term in Equation 17 is the force control term. The matrix of gains $K_f$ is a diagonal matrix of the input parameters cfFtGains and $f_r$ and $f_a$ are the desired (reference) and actual move forces measured in the FORCE frame. $f_r$ are given in the cfFtSetPoints input vector. The $f_a$ forces are the move forces computed using move-squeeze decomposition with Equation 7. The degrees of freedom for force control are selected with the cfSelVect and cfComplyVect input vectors. The magnitude of the computed perturbation due to force control in the FORCE frame is then limited as specified by the cfMaxFcVel input vector. The vector of perturbations is then transformed to the MERGE frame and the perturbation transform due to force control, ${}^M trDel_f$, is then computed from the perturbations.

The ${}_T{}^M J \cdot {}^T \delta X_t$ term of Equation 17 represents the motion due to teleoperation inputs. The motion begins as motion of a six DOF hand controller in the operator control station. The joint perturbations each sample interval are converted to equivalent Cartesian perturbations using the hand controller Jacobian. The perturbations are then mapped to the equivalent perturbations of the common object in the TELEOP frame, depending upon the various input parameters. Explanation of the mappings of teleoperation inputs is beyond the scope of this specification. The result are the teleoperation perturbations $^T\delta X_t$ which are then transformed to the equivalent perturbations in the MERGE frame using $_T{}^MJ$. The perturbation transform due to teleoperation, $^MtrDel_t$, is then computed from the perturbations.

The $_D{}^MJ \cdot {}^D\delta X_d$ term in Equation 17 represents motion due to dither signals. Triangular dither waveforms are generated in each DOF of the DITHER frame as specified by the dtWaveMag and dtPeriod input vectors. These generate the $^D\delta X_d$ dither perturbations each sample interval which are then transformed to the MERGE frame. The perturbation transform due to dither, $^MtrDel_d$, is then computed from the $^M\delta X_d$ perturbations.

Joint space joint limit and joint singularity avoidance is represented by the $^M\delta X_j$ term of Equation 17. As a joint limit or joint singularity is approached, a joint perturbation is computed, $\delta\theta_i$, based upon a repelling force.

$$\delta\theta_i = \frac{k_{\theta i}}{\theta_{actual i} - \theta_{limit i}} \quad (18)$$

where $k_{\theta i}$ is the gain for joint limit i or joint singularity i, $\theta_{actual i}$ is the actual joint angle, and $\theta_{limit i}$ is the limit that the joint is approaching, either as a joint limit or singularity. $k_{\theta i}$ is element i in the jaGain input vector. The joint limit and joint singularity perturbation is only computed if the distance $\theta_{actual i} - \theta_{limit i}$ is less than the threshold given in the jaThres input vector. Joint limit and joint singularity avoidance is computed for both robots.

The perturbations for a sample interval in the MERGE frame are $$^M\delta X_j = {}_{TNR}{}^MJ \cdot {}^{TNR}J_{TNR} \cdot \delta\theta_{rj} + {}_{TNL}{}^MJ \cdot {}^{TNL}J_{TNL} \cdot \delta\theta_{lj} \quad (19)$$

where $\delta\theta_{rj}$ and $\delta\theta_{lj}$ are the vectors of joint space perturbations for the right and left arms. There are two types of Jacobians used in Equation 19, Jacobians relating Cartesian perturbations at two different frames attached to the same rigid body, e.g., $_{TNR}{}^MJ$, and Jacobians which relate joint space perturbations to Cartesian perturbations, e.g., $^{TNR}J_{TNR}$. The perturbation transform due to joint space joint limit and joint singularity avoidance, $^MtrDel_j$, is then computed from the $^M\delta X_j$ perturbations.

The sensor based motion transform, trPtObj, is updated each sample interval using all of the sensor perturbation transforms.

$$^MtrPtObj = {}^MtrDel_s \cdot {}^MtrDel_f \cdot {}^MtrDel_t \cdot {}^MtrDel_d \cdot {}^MtrDel_j \cdot {}^MtrPtObj \quad (20)$$

Equation 20 is the actual implementation of Equation 17.

In summary, the operation of the system of FIG. 4 may be described with reference to FIG. 3 as follows: A move-squeeze decomposition processor 130 of FIG. 4 computes actual move and squeeze decomposition forces based upon current robot force sensor outputs (block 13 of FIG. 3). A compliant motion processor 140 of FIG. 4 transforms plural object position perturbations of the plural behaviors from the respective behavior spaces to a common space, and computes a relative transformation to a behavior-commanded object position from the object position perturbations of the plural behaviors (block 14 of FIG. 3). A trajectory processor 160 of FIG. 4 computes, from the transformations to (a) the object initial position and (b) the object destination position, and from the current time, a drive transformation to a relative object position (block 16 of FIG. 4). A kinematic processor 180 of FIG. 4 updates a transformation to a current commanded object position based upon the relative transformation to the behavior-commanded object position and based upon the drive transformation each sampling interval (block 18 of FIG. 3). A multiple arm squeeze control processor 220 of FIG. 4 computes, from appropriate squeeze force input parameters and from actual squeeze forces for each of the arms, a squeeze control position perturbation for each of the arms to provide squeeze control (blocks 22 and 24 of FIG. 3). An inverse kinematics processor 280 of FIG. 4 computes, from the commanded object position transformation and from the squeeze control position perturbation, new robot joint angles (blocks 26 and 28 of FIG. 3). The robot servos then move corresponding joints of the arms to the new robot joint angles.

VII. Safety Monitoring

Safety is a primary concern during task execution. The DAGCM primitive provides monitoring of various states of the system. Several force and torque thresholds are monitored. If the magnitude of the force or torque vector exceeds the input threshold, the motion is stopped and the cause is sent back to the calling system. ctFThres and ctTThres are the thresholds for monitoring the contact (move) forces and sqRFThres, sqRTThres, sqLFThres and sqLTThres are the thresholds for monitoring the squeeze forces. The accumulated motion due to sensor based control, which is represented by trPtObj, is also monitored. The fsPThres and fsOThres thresholds are the maximum allowable translational and angular motion due to sensor based motion. The jSafetyLim threshold is the minimum allowable distance to a joint limit or singularity.

VIII. Termination Condition Monitoring

The termination condition monitor tests for satisfaction of input termination conditions and stops motion if the input conditions are satisfied. Termination conditions are not tested until the trajectory generator has completed (the trDrive transform is identity). All sensor based motion continues until the selected termination conditions are satisfied, or until endTime seconds have past since the trajectory generator finished. The condition for termination of motion is sent back to the calling system.

IX. Shared Control

Shared control is the merging of teleoperation and autonomous control in real time during task execution. This may take various forms. Compliant teleoperation is where the operator controls the motion of the object and the autonomous system controls the contact (move) and squeeze forces. Partitioned shared control is where certain task space degrees of freedom are controlled by the operator with a hand controller and the others are controlled by the autonomous system. The task primitive described in this specification provides shared control as specified by the input parameters. For partitioned shared control, the tpSelVect input vector selects which degrees of freedom are to be controlled by the operator via the hand controller.

X. Implementation Environment

The DAGCM task execution primitive has been implemented in the JPL Supervisory Telerobotics (STELER) laboratory. The primitive controls two PUMA 560 task execution manipulators equipped with LORD wrist force-torque sensors and parallel jaw servoed grippers. The implementation environment is described in more detail in [2]. The Cartesian level dual-arm control was run with a 10 ms sample rate. Joint position servo control was run with a 1 ms sample rate.

XI. Experimental Results

The task primitive has been utilized for execution of various cooperative dual-arm space telerobotic tasks both under supervisory and shared control. The tasks are described below along with the primitive parameters used for the tasks. Experimental results of some of the tasks are also given. The tasks described below all have trTeleop and trForce set to the identity transform. Therefore the MERGE, FORCE, and TELEOP frames are the same. In the discussion, contact forces and torques are the forces and torques in the move space. Contact and move space are used interchangeably.

XI.1 Orbital Replacement Unit Manipulation

The dual-arm orbital replacement unit (ORU) changeout task was accomplished using both supervisory and shared control. The ORU has two pins, each of which extends from the bottom of the ORU directly beneath a grapple lug. The ORU is grasped by both manipulators at the stowbin (tilted in the background of the photograph), the ORU is removed, moved to an approach location above the platform (between the two manipulators), and inserted into the platform. The parameters common to all of the ORU tasks are given below. The mass properties, massPropR and massPropL, of the load as seen by the two manipulators were the same so that the load was shared equally. The mass was 3.8 N. The vector, with respect to the TN frame, to the center of mass (in mm) was (120, 0, 250) for the left arm and (−120, 0, 250) for the right arm. The transform trRObj was a translation of −330 mm along the X axis. trForce was the identity transform. cfSelVect was (1,1,1,1,1,1) and cfComplyVect was (0,0,0,0,0,0) so that all six DOFs were force controlled. The contact force control gains, cfFtGains, were (0.02, 0.02, 0.02, 0.00002, 0.00002, 0.00002) where translational gain units are mm/N and orientational gain units are deg/N-mm. whichHC was set to use the right hand controller. teleMode was set to camera mode although tool and world modes were also available. trCamera was automatically set based upon the current position of the camera robot. trTeleop was set to the identity transform. tpSelVect was set to (1,1,1,1,1,1) so that the operator could control all six DOF if desired. teleWeights was set so that there was approximately a one to one mapping from hand controller motion to manipulator motion. Dither and stiffness control were not used in the experiments. trGrR and trGrL were both translations of 400 mm along the Z axis which corresponded to grasp frames 130 mm below the actual grapple lugs. Squeeze control force control gains, sqFtGainsL and sqFtGainsR, were (0.04, 0.04, 0.04, 0.00004, 0.00004, 0.00004) where translational gain units are mm/N and orientational gain units are deg/N-mm. Squeeze control spring gains, sqSpGainsL and sqSpGainsR, were all set to 0. ctFThres and ctTThres were 200N and 45000 N-ram, respectively. sqRFThres and sqRTThres were 200N and 45000 N-ram, respectively. sqLFThres and sqLTThres were set equal to sqRFThres and sqRTThres. fsPThres and fsOThres were set large so that they would not be tripped. jSafetyLim was set to 10 deg. Termination conditions were not used in the experiments to stop the motion. Motion was stopped on operator interrupt for teleoperation and shared control, or time or position threshold (fsPThres) for autonomous control. All sensor based motion maximum velocities were set to large-values for the experiments so that the control would not be affected by velocity limiting.

The autonomous control sequence to remove, translate, and insert the ORU will now be described. Joint limiting was not used for autonomous control since autonomous control tasks should be planned a priori and joint limits should not be encountered. Also, joint limit control during contact tasks could cause joint space motions which would cause undesired Cartesian space motions. The squeeze force setpoints, sqForceSpL and sqForceSpR, were set to 0 so that no internal forces would build up in the ORU. The autonomous remove and insert tasks relied on contact force control (move space) to cause motion so trTnDest was automatically set to cause no trajectory generator based motion, timeSpeed was set to time, and segVal to a time longer than the remove or insert tasks should take, 8 sec. For the dual-arm ORU removal task, the force control setpoints, cfFtSetpoints, were set to zero except for the setpoint along the Z axis which was set to 25N. The fsPThres threshold was set to 150 mm. Control of the Z axis contact force to 25N caused the manipulators to pull the ORU out of the stowbin. When the ORU moved 150 mm under sensor based motion force control in this case), then the fusion monitor signaled that the fsPThres was exceeded and the motion stopped and the cause of termination was returned to the operator control station and displayed.

For autonomous translation from the stowbin to the approach location above the platform, the contact force gains, cfFtGains, were set to zero, as were the squeeze control gains, sqFtGainsR, for the right arm. The squeeze control gains for the left arm were the same as for the remove task. This way the right and left arms would follow the nominal trajectory of the common object and any internal forces that built up were dissipated by squeeze control with the left arm. The ORU would go to the proper destination since the right arm moved only kinematically - with no sensor based motion. Two guarded motion commands were used: first to a via point, and then to the platform approach position. As indicated in FIG. 6A, the approach position was approximately 90 mm above the inserted position. trTnDest was used to specify the destinations and timeSpeed was set to velocity based motion.

The parameters for the autonomous ORU insert task were the same as for the autonomous remove task except for the force to cause insertion and the distance threshold. For the dual-arm ORU insert task, the force control setpoints, cfFtSetpoints, were set to zero except for the setpoint along the Z axis which was set to −10N. The negative value caused the manipulators to push the ORU into the platform so that the pins inserted into the passive connector holes. The fsPThres threshold was set to a distance greater than expected for the insertion (e.g., 200 mm) so that the motion would stop on the endTime termination condition of 0 sec. after the 8 sec. task execution time specified with segVal. This was used rather than the expected insertion distance because the insertion distance could not be known exactly and it was desired to insert as far as possible. Other termination conditions might also be used such as endTransVel, endAngVel, endForccErr, endTorqueErr, endForceVel, and endTorqueVel.

Figure 5A:
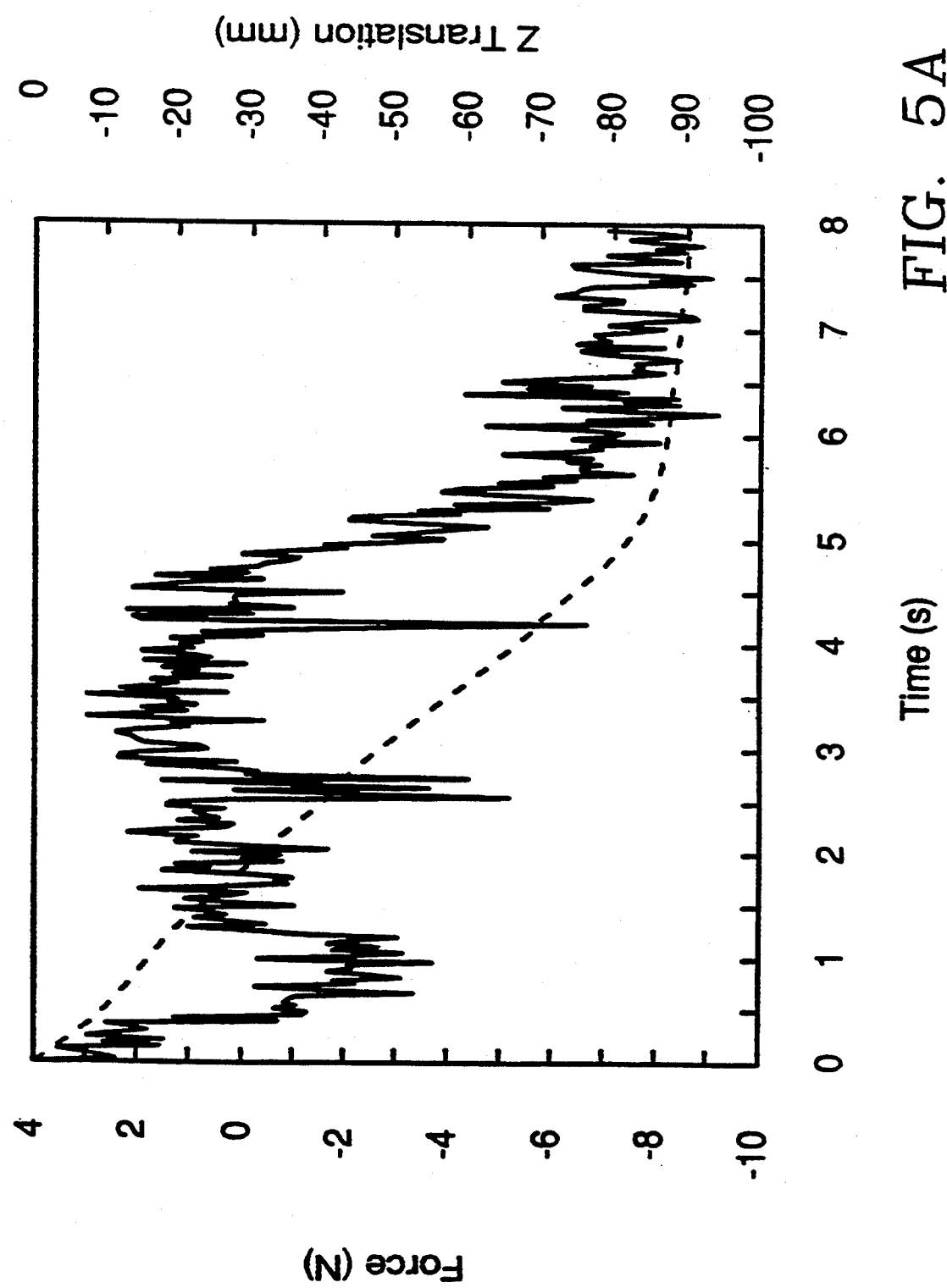
FIGS. 5A and 5B are graphs of force measurements over time and show forces, torques, and translation for an experiment in applying the invention to an autonomous ORU insertion task.
Figure 5B:
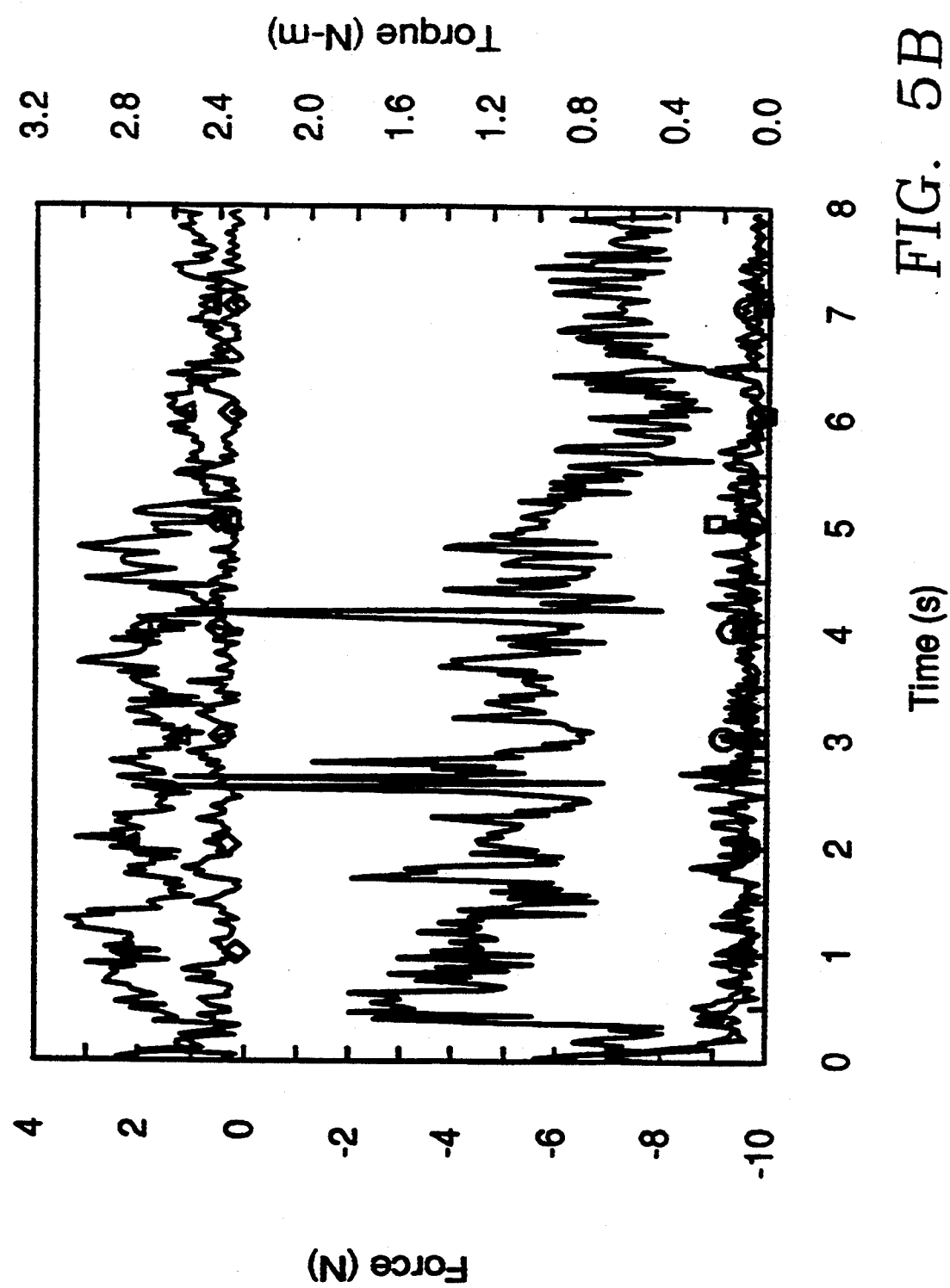

FIGS. 5A and 5B show forces, torques, and translation for the experiment. The right and left arm squeeze force vector magnitudes were equal within 0.0051N. In FIG. 5A showing an autonomous ORU insertion task, the solid line is the contact force along FORCE Z, while the dashed line is the translation along MERGE Z. In FIG. 5B showing an autonomous ORU insertion task, the line with no symbol is the contact torque vector magnitude in FORCE, indicates the left arm squeeze torque vector magnitude in GRL, □ indicates the right arm squeeze torque vector magnitude in GRR, Δ indicates the combined magnitude of X and Y components of the contact force vector, and indicates the left arm squeeze force vector magnitude in GRL and right arm squeeze force vector magnitude in GRR. FIG. 5A shows that force control caused motion along the Z direction until the ORU was inserted (approximately 90 mm); then the force increased to its setpoint since motion was now constrained in this DOF (there seems to be an approximately 2N bias in the Z force, perhaps due to an incorrect mass property). Free motion to contact between the ORU pins and the chamfers leading into the holes occurs during the first 0.5 sec. One or both of the pins then slide down the chamfer until approximately the 1.5 seconds point when the pins then are in the hole and there is little resistance to the insertion until the insertion is complete. The spikes in the forces are due to collisions between one of the pins and a ledge inside its hole (this internal ledge should have been tappered to eliminate this). There is correspondence between the magnitude of the force and the slope of the position curve. The motion step each sample interval is proportional to the error in force. Therefore, when there is more resistance to motion, i.e., contact with a surface, then the force will increase and the rate of motion will decrease. FIG. 5B shows that the forces and torques in the other DOFs remained small during the task, as desired.

Figure 6:
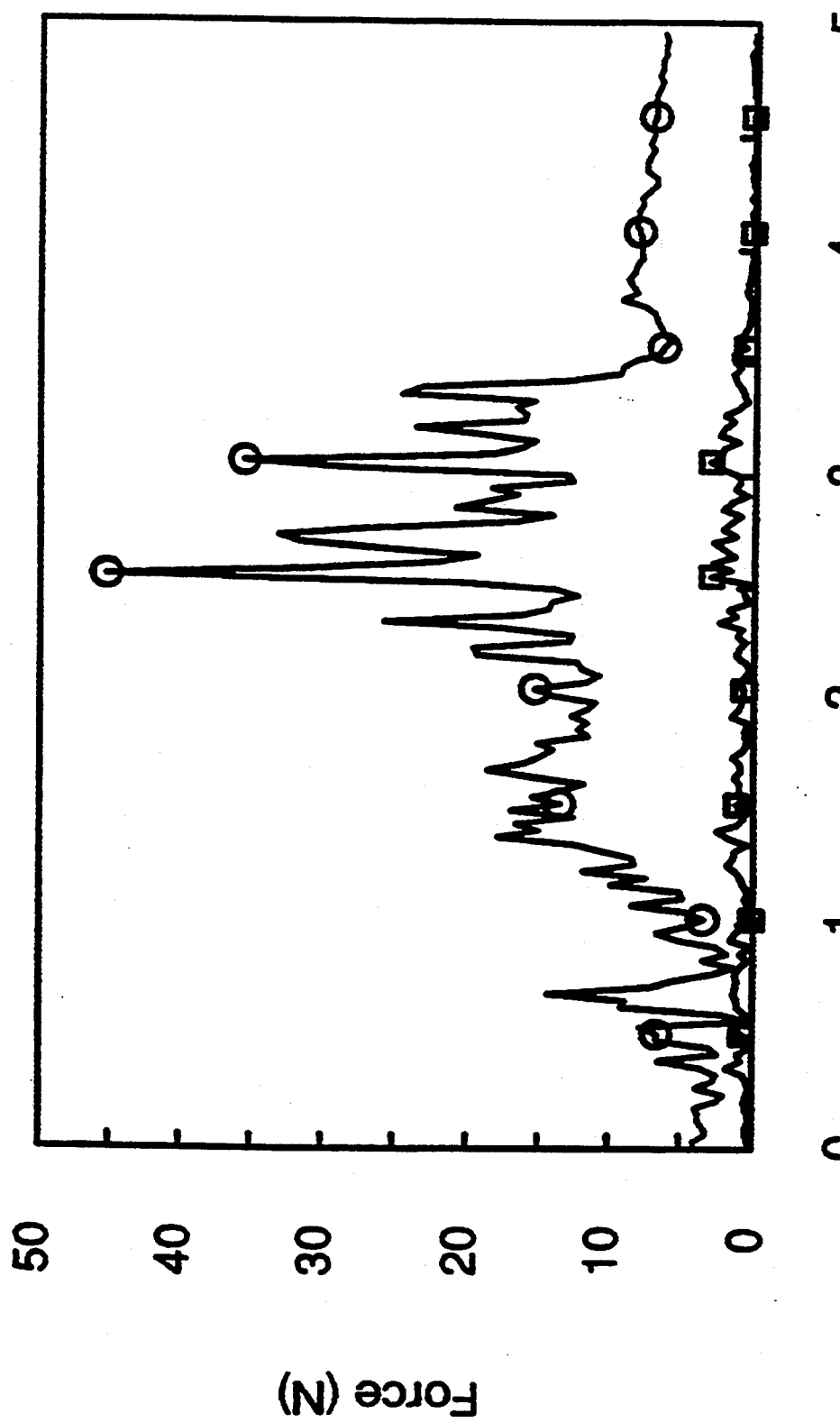
FIG. 6, is a graph of force measurements over time showing forces during shared control teleoperation ORU insertion.
Figure 7:
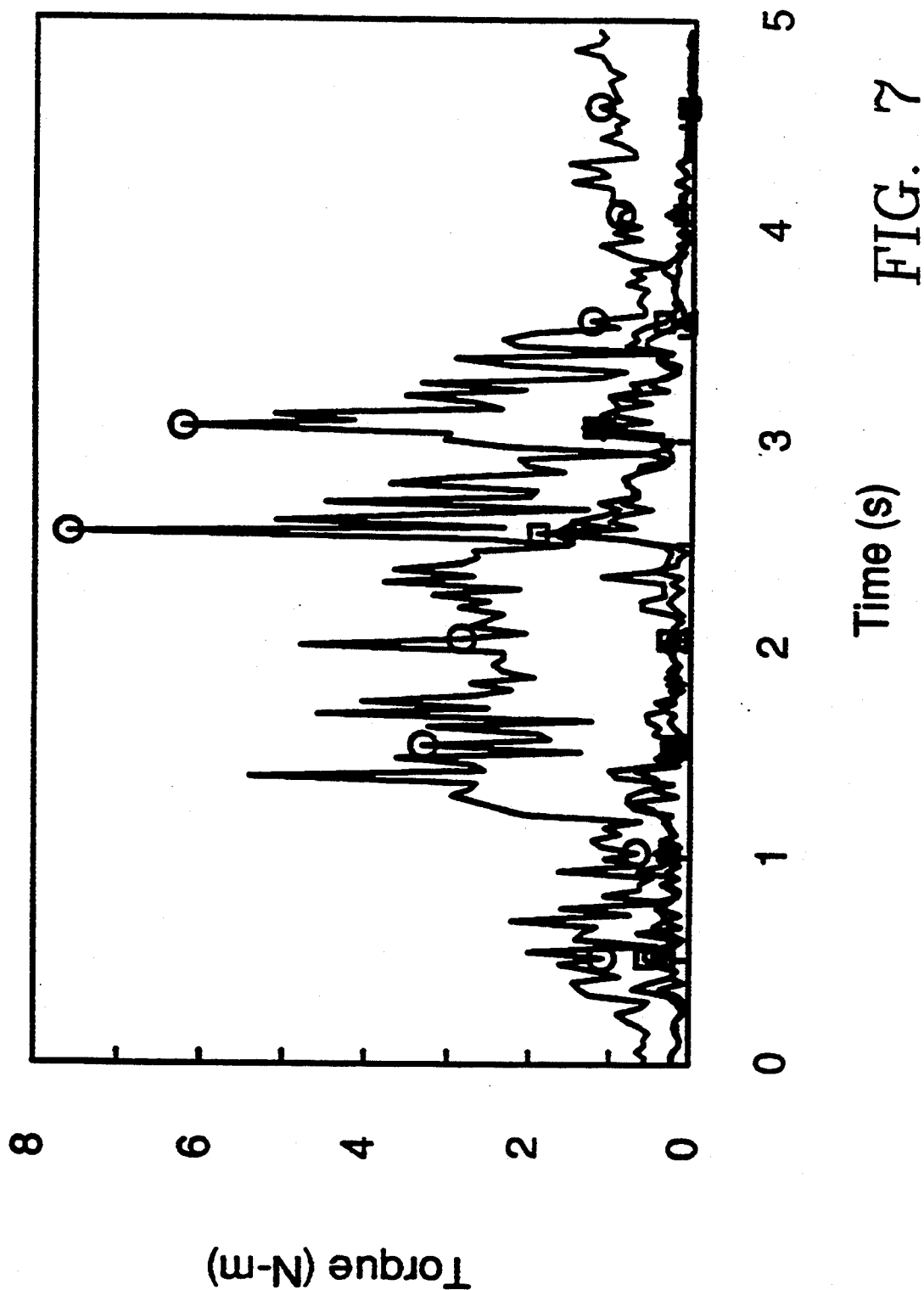
FIG. 7 is a graph of torque measurements over time showing torques during shared control teleoperation ORU insertion.
Figure 8:
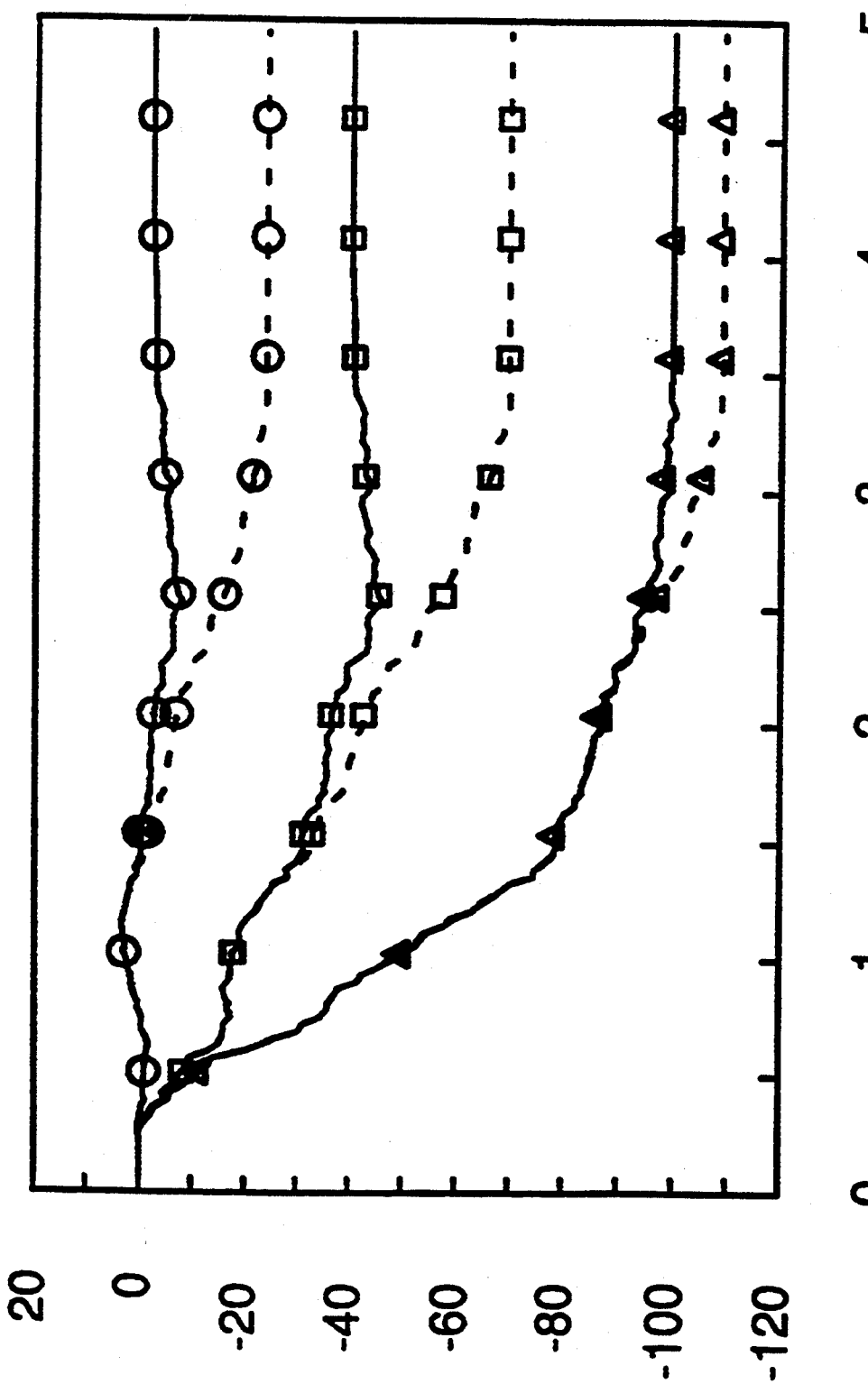
FIG. 8 is a graph of position measurements showing translations during shared control teleoperation ORU insertion.
Figure 9:
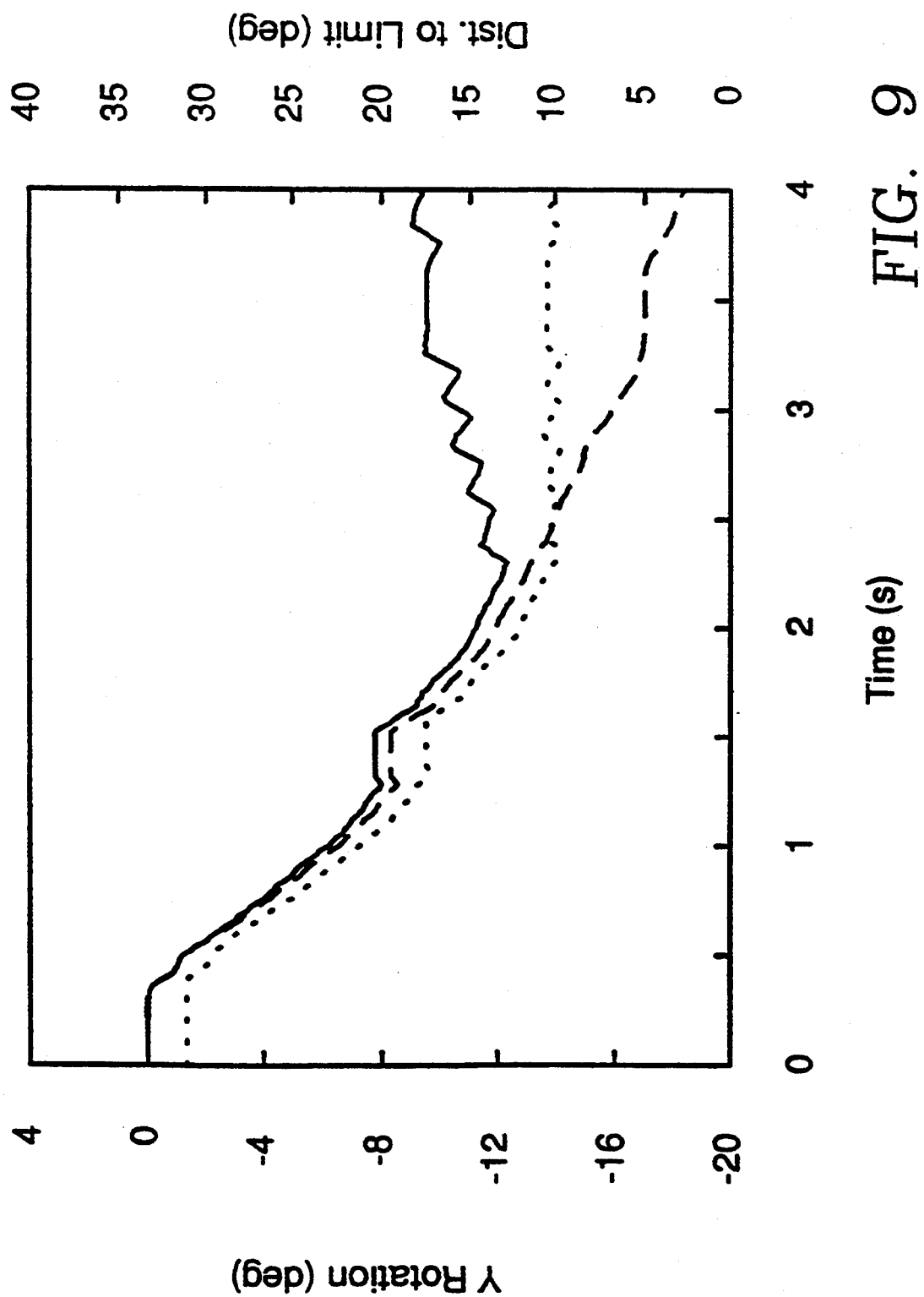
FIG. 9 is a graph of measured joint angle as a function of time showing joint limit avoidance in an experiment testing the joint limit avoidance feature of the invention.

Execution of the remove, translate, and insert task using shared control teleoperation required only one command which initiated the task. Joint limiting was not used since contact tasks were involved. No trajectory generator motion was used so trTnDest was automatically set to cause no trajectory generator based motion, timeSpeed was set to time, and segVal was set to a time longer than the task should take. The contact force control setpoints, cfFtSetpoints, were set to zero and gains set to the default values above. The squeeze control setpoints and gains were set to the default values above. FIGS. 7, 8 and 9 show forces, torques, and translations from the shared control teleoperation ORU insertion task. The right and left arm squeeze force and torque vector magnitudes were equal within 0.0083N and 0.033 N-m, respectively. In FIG. 6, showing forces during shared control teleoperation ORU insertion, the indicates contact force vector magnitude in FORCE, and □ indicates the left arm squeeze force vector magnitude in GRL and right arm squeeze force vector magnitude in GRR. In FIG. 7 showing torques during shared control teleoperation ORU insertion, the indicates contact torque vector magnitude in FORCE, □ indicates left arm squeeze torque vector magnitude in GRL, and Δ indicates right arm squeeze torque vector magnitude in GRR. In FIG. 9 showing translations during shared control teleoperation ORU insertion, the solid lines are actual sensor based motion in MERGE, dashed lines are integrated teleoperation inputs in TELEOP, indicates X, □ indicates Y, and Δ indicates Z.

The integrated teleoperation inputs of FIG. 9 are the sum of the teleoperation perturbations per sample interval. The actual motions along the different axes of the MERGE frame are less than the integrated teleoperation inputs because of force control. Force control caused motion to reduce the contact forces and torques.

Joint limit avoidance was demonstrated for free space teleoperation of the ORU. The parameters for shared control teleoperation ORU insertion above were used for the joint limit avoidance experiment except the gain, jaGain, was set to 1.64 $deg^2$ and jaThres was set to 10 deg. Joint limit avoidance worked well except for one case: when joint 5 of both manipulators approached joint limits at the same time. Then the joint limiting control of the two arms counteracted each other and rather than moving away from the limits, the limits were exceeded. For all joints and for all other cases, the joint limiting control worked properly to avoid joint limits. In the joint limit avoidance experiment of FIG. 9, the operator input rotation about the TELEOP frame Y axis which caused joint 5 of the right arm to approach its limit. FIG. 9 shows the results of the joint limit avoidance experiment. In FIG. 9 showing joint limit avoidance, the dashed line is the integrated teleoperation input about TELEOP Y, solid line is the actual rotation about MERGE Y and the dotted line is the distance to the joint 5 limit. FIG. 9 shows that when the Cartesian teleoperation inputs would have caused joint 5 to move within its joint margin (parameter jaThres = 10 deg), joint limit avoidance caused Cartesian motion to keep the joint out of its joint margin.

Figure 10:
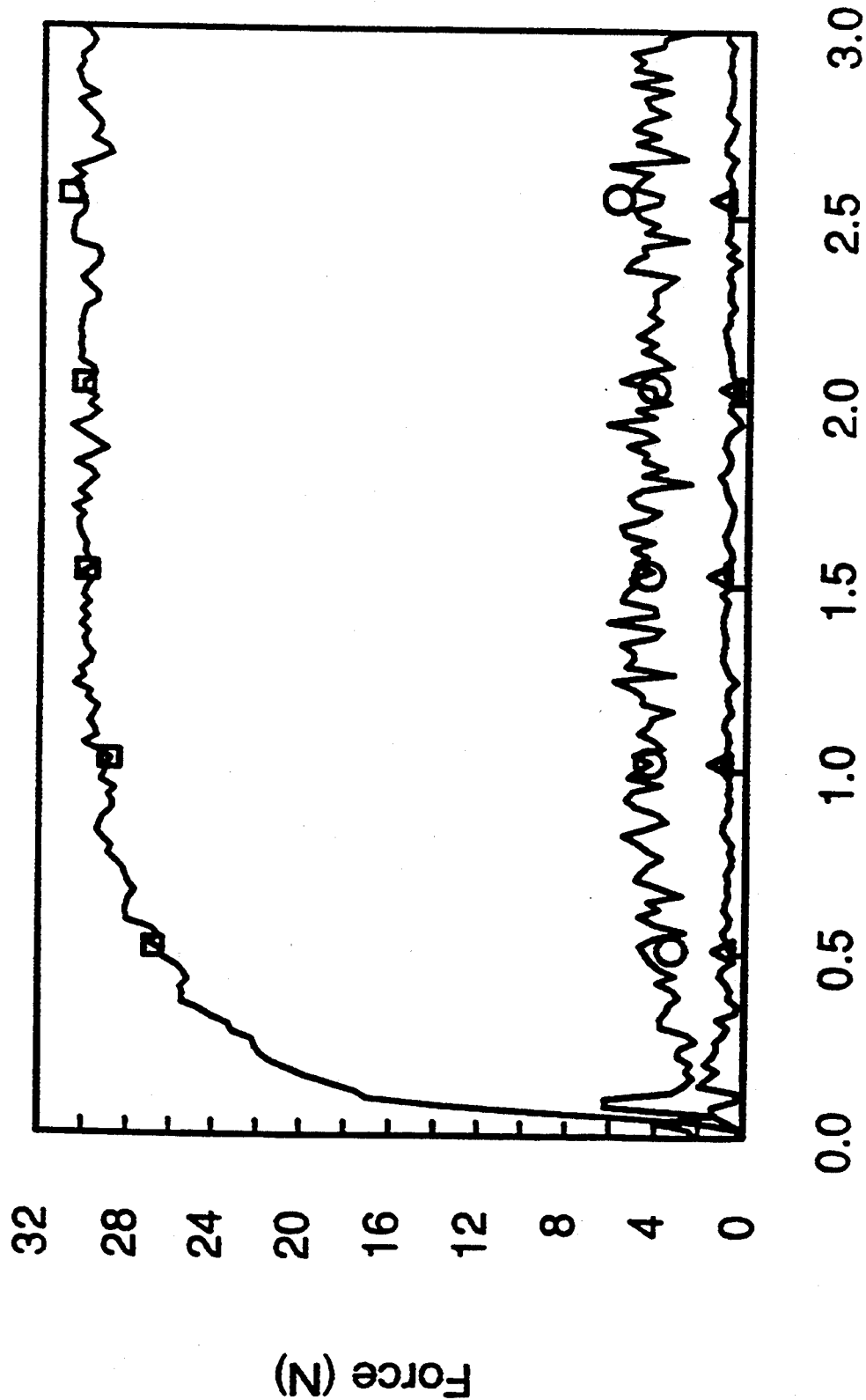
FIG. 10 is a graph of measured force over time showing forces during squeeze control exerted on the ORU.
Figure 11:
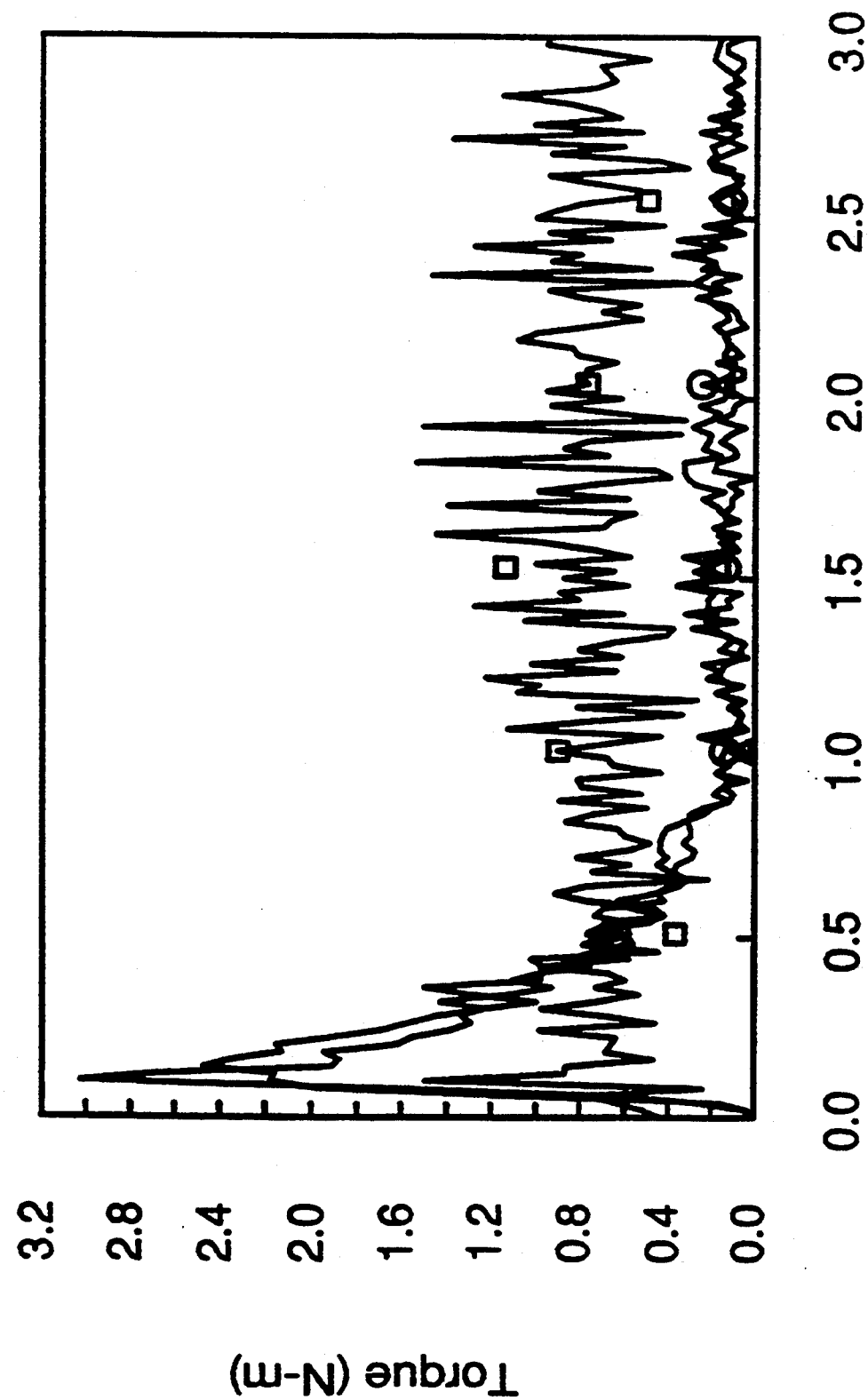
FIG. 11 is a graph of measured torque over time showing torques during squeeze control on the ORU.

Two tasks were conducted to demonstrate squeeze control In the first task, the ORU was squeezed (actually pulled apart) with a force of 30N during teleoperation in free space. The default parameters above were used except the squeeze force setpoints, sqForceSpL and sqForceSpR, along the X axes were set to −30N for the right arm and 30N for the left arm. FIGS. 10 and 11 show forces and torques from the experiment. In FIG. 10 showing forces during squeeze control on ORU, □ indicates left arm squeeze force along GRL X axis, Δ indicates combined magnitude of GRL Y and Z components of the left arm squeeze force vector and indicates move space force vector magnitude in the FORCE frame. In FIG. 11 showing torques during squeeze control on ORU, □ indicates the move space torque vector magnitude in the FORCE frame, indicates the right arm squeeze torque vector magnitude in GRR, and Δ indicates the left arm squeeze torque vector magnitude in GRL. FIGS. 10 and 11 show that an internal squeeze force was generated in about 1 second and then maintained while the forces and torques in the other DOFs of the squeeze space and in all DOFS of the move space remained small.

In the second task demonstrating squeeze control, an object with two sections held together with rubber bands was squeezed (actually pulled apart as in the ORU experiment) so that the sections separated. The object was connected with eight rubber bands (four on top and four on the bottom). Each manipulator was given the mass properties of one half of the object. The right arm load mass properties were then 2.9N and center of mass (−27, 4.5, 241) in mm. The left arm load mess properties were 2.8N and center of mass (23, −5.6, 243) in mm. The other parameters were the same as in the squeeze control task for the ORU above. The DAGCM primitive was used for teleoperation of the object while simultaneously maintaining a constant squeeze force of 30 Newtons to maintain a separation of the two halves of the object (of about 4 cm).

XI.2 Fluid Coupler Manipulation

A combination of shared control teleoperation and supervised autonomy was used for the fluid coupler mating and turning task.

The parameters common to all of the fluid coupler tasks were the same as the default parameters above for the ORU tasks except for those given below. The mass properties, is massPropR and massPropL, of the load us seen by the two manipulators were the same so that the load was shared equally. The mass was 2.8N. The vector, with respect to the TN frame, to the center of mass (in mm) was (50, 4, 235) for the left arm and (−50, 4, 235) for the right arm. The transform trRObj was a translation of −140 mm along the X axis. trGrR and trGrL were both translations of 250 mm along the Z axis which corresponded to grasp frames approximately 60 mm below the actual grasp locations. Squeeze control force control gains, sqFtGainsL and sqFtGainsR, were (0.01, 0.01, 0.01, 0.00001, 0.00001, 0.00001) where translational gain units are mm/N and orientational gain units are deg/N-mm. The first task was shared control teleoperation of the fluid coupler to the satellite and approximate alignment of the coupler for insertion.

Figure 12:
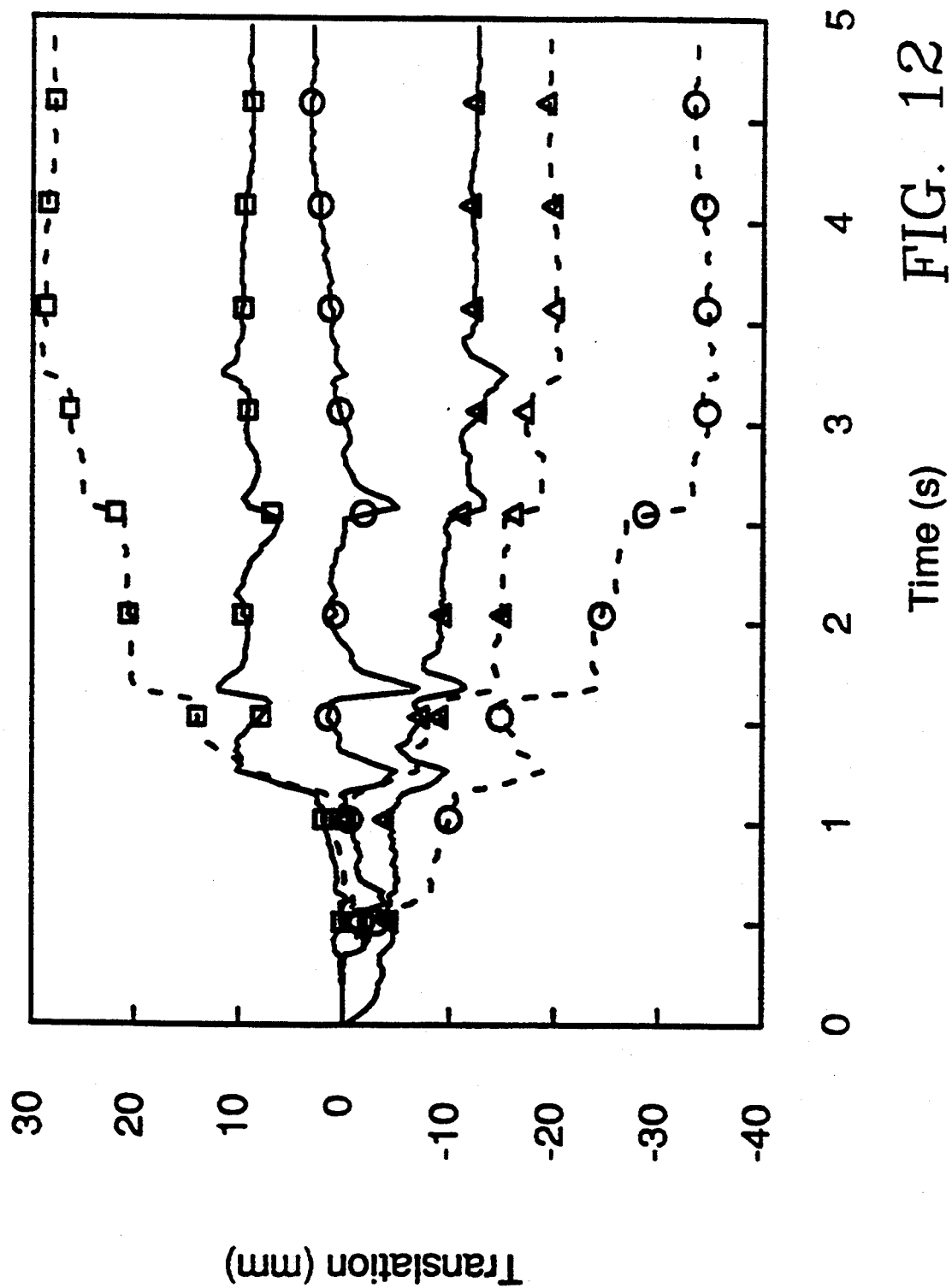
FIG. 12 is a graph of measured position over time showing translations during shared control fluid coupler mating task.
Figure 13:
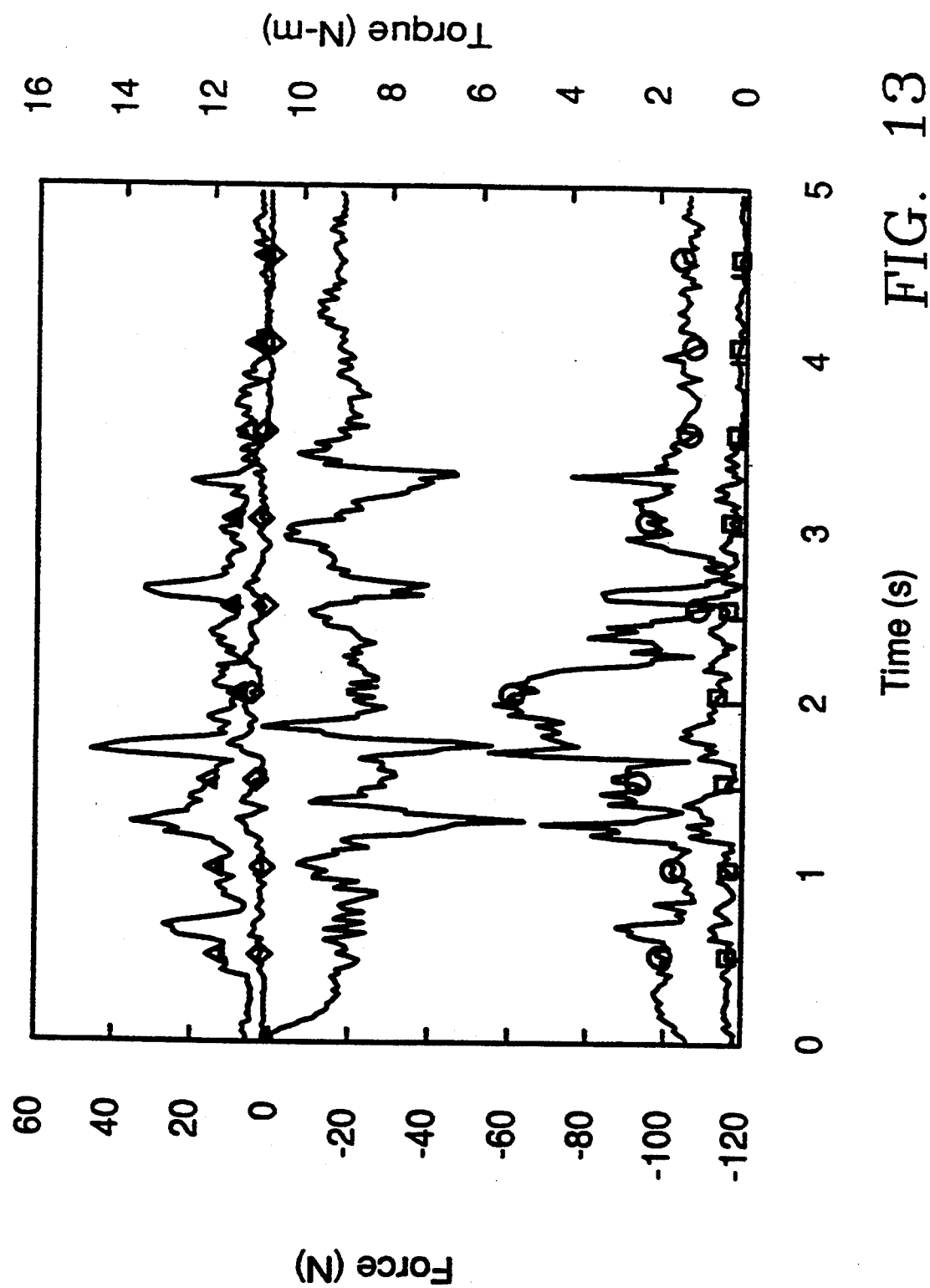
FIG. 13 is a graph of measured forces and torques over time showing forces and torques during shared control fluid coupler mating task.

The second task was shared control insertion of the coupler. The operator moved the coupler with teleoperation inputs in all six DOF and a force setpoint along the FORCE frame Z axis of −20N caused the autonomous system to push the coupler in. The tight tolerances between the mating parts and the required accurate alignment made the task difficult. The autonomous force control aided the operator by pushing the coupler in while the operator aligned it. Also, the autonomous force control kept the coupler in place once it was properly seated. FIGS. 12 and 13 show translations, forces, and torques from the experiment. The right and left arm squeeze force and torque vector magnitudes were equal within 0.0063N and 0.077N-m, respectively. In FIG. 12 showing translations during shared control fluid coupler mating task, the solid lines are actual sensor based motion in MERGE, the dashed lines are integrated teleoperation inputs in TELEOP, indicates X, □ indicates Y, and △ indicates Z. In FIG. 13 showing forces and torques during shared control fluid coupler mating task, indicates the move space torque vector magnitude in FORCE, □ indicates the left arm squeeze torque vector magnitude in GRL, the line with no symbol is contact force along FORCE frame Z axis, △ indicates the combined magnitude of FORCE frame X and Y components of tile contact force vector, and indicates the left arm squeeze force vector magnitude in GRL and right arm squeeze force vector magnitude in GRR.

Figure 15:
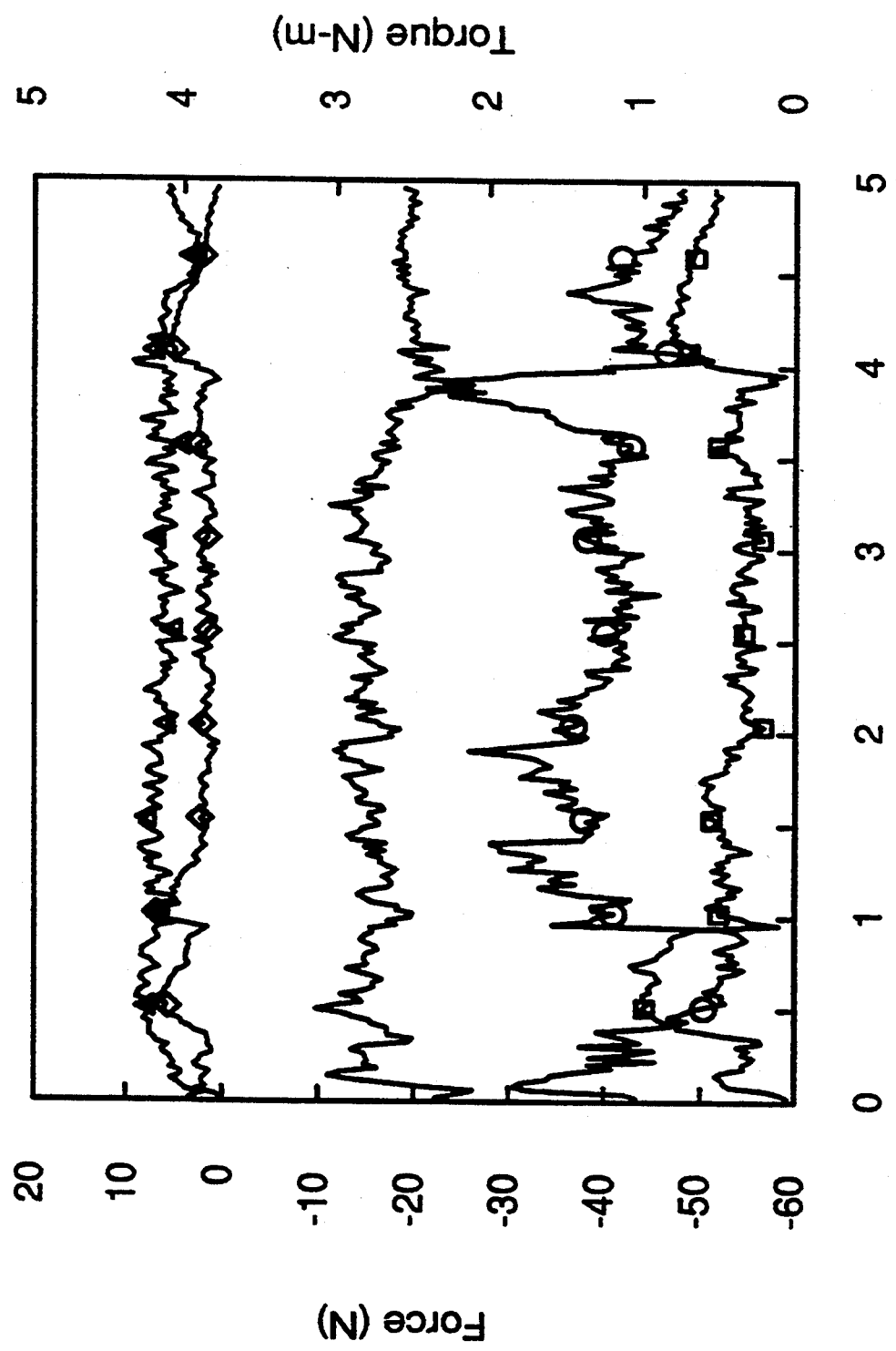
FIG. 15 is a graph of measured force over time showing torque during the autonomous fluid coupler turning task.

The differences in FIG. 15 between the actual motion in the different DOFs and the motion specified by the teleoperation inputs was due to force control. The teleoperation inputs were used to align the coupler. FIG. 13 shows that the force along FORCE Z was controlled to −20N while forces and torques in the other DOFs were dissipated. The differences from the setpoints were due to the impacts caused by the teleoperation inputs.

Figure 14:
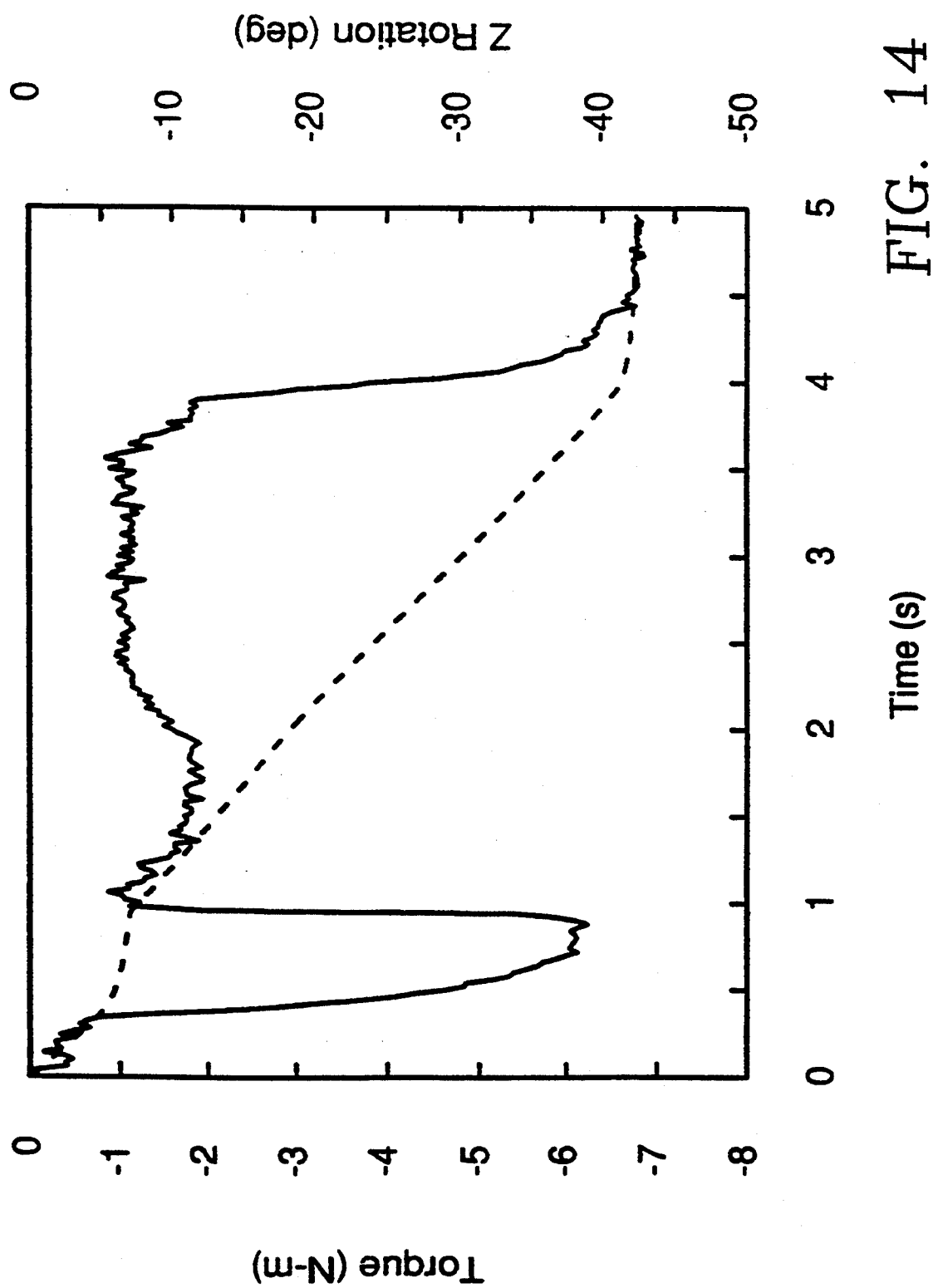
FIG. 14 is a graph of measured torque over time showing torque during the autonomous fluid coupler turning task.

The third task was turning and locking the fluid coupler. This was accomplished by controlling the squeeze forces to be zero and the contact (move space) forces to have a force pushing the coupler into the nozzle (−20N) and a torque to cause the turning (−8N-m). The cfFtSetpoints input vector was therefore (0,0,−20 N,0,0,−8N-m) FIGS. 14 and 15 show rotation, torques, and forces for the experiment. The right and left arm squeeze force and torque vector magnitudes were equal within 0.0037N and 0.096N-m, respectively. In FIG. 14 Showing the autonomous fluid coupler turning task, the solid line is the contact torque about FORCE Z, and the dashed line is the rotation about MERGE Z. In FIG. 15 showing the autonomous fluid coupler turning task, the line with no symbol is contact force along FORCE frame Z axis, △ indicates the combined magnitude of FORCE frame X and Y components of the contact force vector, indicates the left arm squeeze force vector magnitude in GRL and right arm squeeze force vector magnitude in GRR, indicates the combined magnitude of FORCE frame X and Y components of the contact torque vector, and □ indicates the left arm squeeze torque vector magnitude in GRL. FIG. 14 shows that the coupler got snagged at the beginning of the task but broke free after applying approximately 6 N-m. This snagging problem was also observed under dual-arm human control. Application of the dither input may help for this type of situation. As expected the rate of rotation decreased when the torque built up upon encountering resistance. The coupler could only rotate a finite amount, which was achieved after about 4 sec., when the torque increased to near its setpoint. The reason for the approximately 1 N-m error in steady state torque is unknown.

XI.3 Dual-Arm Contour Following

Partitioned dual-arm shared control was demonstrated with the dual-arm contour following task. The operator input motion in only three degrees of freedom of the task (TELEOP) frame, tangential to the surface and about the surface normal, thus preventing any motion which may be damaging to the object. Autonomous force control of 30N against the surface and force control about the tangential axes of the object caused the manipulators to automatically keep the flat tool surface tangential to the dome with a constant contact point in the center of the tool. The three DOFs for operator inputs were selected using a tpSelVect input vector of (1,1,0,0,0,1). The transform trRObj was a translation of −120 mm along the Y axis. trGrR and trGrL were both translations of 335 mm along the Z axis. Squeeze control force control gains, sqFtGainsL and sqFtGainsR, were (0.01, 0.01, 0.01, 0.00001, 0.00001, 0.00001) where translational gain units are mm/N and orientational gain units are deg/N-mm. The cfFtSetpoints input vector was (0,0,−30N,0,0,0) and the cfFtGains input vector was (0.03, 0.03, 0.02, 0.00008, 0.00008, 0.00001) where translational gain units are mm/N and orientational gain units are deg/N-mm.

XI.4 Dual-Arm Satellite Capture

Shared control teleoperation was demonstrated in the dual-arm satellite capture task. The arms follow a fictitious common object whose motion is controlled by the operator with a hand controller. No squeeze control is used. The operator moves the one hand controller to make the arms capture the handles on the satellite as it rotates into the workspace. Force control of the contact (move) forces is used to damp the motion of the satellite after capture to cause it to stop moving. The transform trRObj was a translation of −120 mm along the Y axis which was midway between the grippers. trGrR and trGrL were both translations of 225 mm long the Z axis. The cfFtGains input vector was (0.07, 0.07, 0.07, 0.00004, 0.00004, 0.00004) where translational gain units are mm/N and orientational gain units are deg/N-mm. After tile satellite was captured, the grippers were closed on the satellite handles.

In summary, the dual-arm generalized compliant motion task execution primitive provides cooperative dual-arm control task execution capability to a higher level planning system. The primitive provides multiple sensor based control including teleoperation which allows shared control execution. A unified algorithm for autonomous, teleoperation, and shared control is utilized to provide a wide range of task execution capability. Description of the execution of various tasks using the primitive demonstrates the effectiveness of the method.

While the invention has been described in detail by specific reference to preferred embodiments, it is understood that variations and modifications thereof may be made without departing from the true spirit and scope of the invention.

What is claimed is:

1. A multiple arm generalized compliant motion robot control system for governing a robot comprising dual multi-joint robot arms handling an object with both of said arms, comprising:

means for defining plural input parameters governing plural respective behaviors to be exhibited by the robot in respective behavior spaces simultaneously;

a move-squeeze decomposition processor means for computing actual move and squeeze decomposition forces based upon current robot force sensor outputs;

compliant motion processor means for transforming plural object position perturbations of said plural behaviors from the respective behavior spaces to a common space, and computing a relative transformation to a behavior-commanded object position in accordance with the object position perturbations of said plural behaviors;

kinematics processor means for updating a transformation to a current commanded object position based upon the relative transformation to the behavior-commanded object position;

multiple arm squeeze control processor means for computing, from appropriate squeeze force input parameters and from actual squeeze forces for each of the arms, a squeeze control position perturbation for each of the arms, whereby to provide squeeze control; and inverse kinematics processor means for computing, from the commanded object position transformation and from the squeeze control position perturbation, new robot arm grasp points, and for controlling respective joints of said robot arms in accordance with said new robot arm grasp points.

2. The system of claim 1 wherein:

said plurality of input parameters comprises: Cartesian, stiffness parameters, force setpoints, joint limits, joint singularities dither wave parameters, teleoperation input frame of reference and a Cartesian trajectory; and said plurality of behaviors comprises, respectively, Cartesian stiffness control, force control, joint limit avoidance, joint singularity avoidance, dither wave motion, teleoperation control and Cartesian trajectory control.

3. The system of claim 2 wherein said compliant motion processor means comprises means for computing position perturbations for all of said plural behaviors and combining all of said position perturbations.

4. The system of claim 1 wherein one of said behaviors comprises Cartesian trajectory control, said system further comprising:

trajectory processor means for computing a drive transformation to a relative object position in accordance with Cartesian trajectory input parameters; and wherein said kinematics processor means updates the transformation to a current commanded object position based upon the relative transformation to the behavior-commanded object position and based upon said drive transformation each sampling interval.

5. The system of claim 4 wherein said drive transformation is computed in accordance with input parameters specifying initial and destination object positions and in accordance with the number of elapsed sampling intervals.

6. The system of claim 1 wherein:

one of said input parameters comprises move force set points;

said compliant motion processor means comprises force control means for computing a position perturbation of said object in accordance with a product of a force control constant and a difference between said move force set points and said actual move forces.

7. The system of claim 1 wherein:

said input parameters comprise joint angle limits and joint angle singularities for individual joints on said arms;

said compliant motion processor means comprises means for computing for each of said arms a position perturbation of said object in accordance with a product of a force field constant and a reciprocal of a difference between actual joint angles sensed by joint angle sensors on said arms and corresponding ones of said joint angle limits and joint angle singularities.

8. The system of claim 6 wherein said joint angle limits, said joint angle singularities and said force set points are comprised within a generalized compliant motion primitive of user-specified input parameters.

9. The system of claim 1 wherein said new robot arm grasp points are computed repetitively in successive sample intervals and wherein said input parameters are changeable each sample interval whereby said plural behaviors are dynamically programmable.

10. The system of claim 1 wherein said plural behaviors comprise at least one of safety monitoring and termination condition monitoring, said system further comprising:
  means for stopping motion of said robot in response to predetermined quantities measured by predetermined sensors on said robot reaching predetermined values specified by corresponding ones of said input parameters.

11. The system of claim 10 wherein:
  there are plural such predetermined quantities and said means for stopping stops said robot motion in response to all of said predetermined quantities meeting said predetermined values.

12. A multiple arm generalized compliant motion robot control system for governing a robot comprising dual multi-joint robot arms handling an object with both of said arms, comprising:
  means for defining plural input parameters governing plural respective behaviors to be exhibited by the robot in respective behavior spaces simultaneously;
  a move-squeeze decomposition processor means for computing actual move and squeeze decomposition forces based upon current robot force sensor outputs;
  compliant motion processor means for transforming plural object position perturbations of said plural behaviors from the respective behavior spaces to a common space, and computing a behavior-commanded object position in accordance with the object position perturbations of said plural behaviors;
  kinematics processor means for updating a current commanded object position based upon the behavior-commanded object position;
  multiple arm squeeze control processor means for computing, from appropriate squeeze force input parameters and from actual squeeze forces for each of the arms, a squeeze control position perturbation for each of the arms, whereby to provide squeeze control; and
  inverse kinematics processor means for computing, from the commanded object position and from the squeeze control position perturbation, new robot arm grasp points and for controlling respective joints of said robot arms in accordance with said new robot arm grasp points.

13. The system of claim 12 wherein:
  said plurality of input parameters comprises: Cartesian stiffness parameters, force setpoints, joint limits, joint singularities, dither wave parameters, teleoperation input frame of reference and a Cartesian trajectory; and
  said plurality of behaviors comprises, respectively, Cartesian stiffness control, force control, joint limit avoidance, joint singularity avoidance, dither wave motion, teleoperation control and Cartesian trajectory control.

14. The system of claim 13 wherein said compliant motion processor means comprises means for computing position perturbations for all of said plural behaviors and combining all of said position perturbations.

15. The system of claim 12 wherein one of said behaviours comprises Cartesian trajectory control, said system further comprising:
  trajectory processor means for computing a relative object position in accordance with Cartesian trajectory input parameters; and
  wherein said kinematics processor means updates the current commanded object position based upon the behavior-commanded object position and based upon said relative object position.

16. The system of claim 15 wherein said relative object position is computed in accordance with input parameters specifying initial and destination object positions and in accordance with the number of elapsed sampling intervals.

17. The system of claim 12 wherein:
  one of said input parameters comprises move force set points;
  said compliant motion processor means comprises force control means for computing a position perturbation of said object in accordance with a product of a force control constant and a difference between said move force set points and said actual move forces.

18. The system of claim 12 wherein:
  said input parameters comprise joint angle limits and joint angle singularities for individual joints on said arms;
  said compliant motion processor means comprises means for computing for each of said arms a position perturbation of said object in accordance with a product of a force field constant and a reciprocal of a difference between actual joint angles sensed by joint angle sensors on said arms and corresponding ones of said joint angle limits and joint angle singularities.

19. The system of claim 17 wherein said joint angle limits, said joint angle singularities and said force set points are comprised within a generalized compliant motion primitive of user-specified input parameters.

20. The system of claim 12 wherein said new robot arm grasp points are computed repetitively in successive sample intervals and wherein said input parameters are changeable each sample interval whereby said plural behaviors are dynamically programmable.

21. The system of claim 12 wherein said plural behaviors comprise at least one of safety monitoring and termination condition monitoring, said system further comprising:
  means for stopping motion of said robot in response to predetermined quantities measured by predetermined sensors on said robot reaching predetermined values specified by corresponding ones of said input parameters.

22. The system of claim 21 wherein:
  there are plural such predetermined quantities and said means for stopping stops said robot motion in response to all of said predetermined quantities meeting said predetermined values.

23. A method for controlling a robot comprising dual multi-joint robot arms handling an object with both of said arms for multiple arm compliant motion, comprising:
  defining plural input parameters governing plural respective behaviors to be exhibited by the robot in respective behavior spaces simultaneously;
  first computing actual move and squeeze decomposition forces based upon current robot force sensor outputs;
  first transforming plural object position perturbations of said plural behaviors from the respective behavior spaces to a common space, and second computing a relative transformation to a behavior-commanded object position in accordance with the object position perturbations of said plural behaviors;

updating a transformation to a current commanded object position based upon the relative transformation to the behavior-commanded object position;

third computing, from appropriate squeeze force input parameters and from actual squeeze forces for each of the arms, a squeeze control position perturbation for each of the arms, whereby to provide squeeze control; and fourth computing, from the commanded object position transformation and from the squeeze control position perturbation, new robot arm grasp points, and controlling respective joints of said robot arms in accordance with said new robot joint angles.

24. The method of claim 23 wherein:

said plurality of input parameters comprises: Cartesian stiffness parameters, force setpoints, joint limits, joint singularities, dither wave parameters, teleoperation input frame of reference and at Cartesian trajectory; and said plurality of behaviors comprises, respectively, Cartesian stiffness control, force control, joint limit avoidance, joint singularity avoidance, dither wave motion, teleoperation control and Cartesian trajectory control.

25. The method of claim 24 wherein said second computing comprises computing position perturbations for all of said plural behaviors and combining all of said position perturbations.

26. The method of claim 23 wherein one of said behaviors comprises Cartesian trajectory control, said method further comprising:

fifth computing a drive transformation to a relative object position in accordance with Cartesian trajectory input parameters; and wherein said updating updates the transformation to a current commanded object position based upon the relative transformation to the behavior-commanded object position and based upon said drive transformation each sampling interval.

27. The method of claim 26 wherein said drive transformation is computed in accordance with input parameters specifying initial and destination object positions and in accordance with the number of elapsed sampling intervals.

28. The method of claim 23 wherein:

one of said input parameters comprises move force set points;

said second computing comprises computing a position perturbation of said object in accordance with a product of a force control constant and a difference between said move force set points and said actual move forces.

29. The method of claim 23 wherein:

said input parameters comprise joint angle limits and joint angle singularities for individual joints on said arms;

said second computing comprises computing for each of said arms a position perturbation of said object in accordance with a product of a force field constant and a reciprocal of a difference between actual joint angles sensed by joint angle sensors on said arms and corresponding ones of said joint angle limits and joint angle singularities.

30. The method of claim 28 wherein said joint angle limits, said joint angle singularities and said force set points are comprised within a generalized compliant motion primitive of user-specified input parameters.

31. The method of claim 23 wherein said new robot arm grasp points are computed repetitively in successive sample intervals, said method further comprising changing selected ones of said input parameters each sample interval whereby to dynamically program said plural behaviors.

32. The method of claim 23 wherein said plural behaviors comprise at least one of safety monitoring and termination condition monitoring, said method further comprising:

stopping motion of said robot in response to predetermined quantities measured by predetermined sensors on said robot reaching predetermined values specified by corresponding ones of said input parameters.

33. The method of claim 32 wherein:

there are plural such predetermined quantities and said stopping stops said robot motion in response to all of said predetermined quantities meeting said predetermined values.

34. A method for controlling a robot comprising dual multi-joint robot arms handling an object with both of said arms for multiple arm compliant motion, comprising:

defining plural input parameters governing plural respective behaviors to be exhibited by the robot in respective behavior spaces simultaneously;

first computing actual move and squeeze decomposition forces based upon current robot force sensor outputs;

first transforming plural object position perturbations of said plural behaviors from the respective behavior spaces to a common space, and second computing a behavior-commanded object position in accordance with the object position perturbations of said plural behaviors;

updating a current commanded object position based upon the behavior-commanded object position;

third computing, from appropriate squeeze force input parameters and from actual squeeze forces for each of the arms, a squeeze control position perturbation for each of the arms, whereby to provide squeeze control; and fourth computing, from the commanded object position and from the squeeze control position perturbation, new robot arm grasp points, and controlling respective joints of said robot arms in accordance with said new robot arm grasp points.

35. The method of claim 34 wherein:

said plurality of input parameters comprises: Cartesian stiffness parameters, force setpoints, joint limits, joint singularities, dither wave parameters, teleoperation input frame of reference and a Cartesian trajectory; and said plurality of behaviors comprises, respectively, Cartesian stiffness control, force control, joint limit avoidance, joint singularity avoidance, dither wave motion, teleoperation control and Cartesian trajectory control.

36. The method of claim 35 wherein said second computing comprises computing position perturbations for all of said plural behaviors and combining all of said position perturbations.

37. The method of claim 34 wherein one of said behaviors comprises Cartesian trajectory control, said method further comprising:

fifth computing a relative object position in accordance with Cartesian trajectory input parameters; and wherein said updating updates the current commanded object position based upon the behavior-commanded object position and based upon said relative object position.

38. The method of claim 37 wherein said relative object position is computed in accordance with input parameters specifying initial and destination object positions and in accordance with the number of elapsed sampling intervals.

39. The method of claim 34 wherein:
one of said input parameters comprises move force set points.
said second computing comprises computing a position perturbation of said object in accordance with a product of a force control constant and a difference between said move force set points and said actual move forces.

40. The method of claim 34 wherein:
said input parameters comprise joint angle limits and joint angle singularities for individual joints on said arms;
said second computing comprises computing for each of said arms a position perturbation of said object in accordance with a product of a force field constant and a reciprocal of a difference between actual joint angles sensed by joint angle sensors on said arms and corresponding ones of said joint angle limits and joint angle singularities.

41. The method of claim 39 wherein said joint angle limits, said joint angle singularities and said force set points are comprised within a generalized compliant motion primitive of user-specified input parameters.

42. The method of claim 34 wherein said new robot arm grasp points are computed repetitively in successive sample intervals and wherein said method further comprises changing selected ones of said input parameters each sample interval whereby to dynamically program said plural behaviors.

43. The method of claim 34 wherein said plural behaviors comprise at least one of safety monitoring and termination condition monitoring, said method further comprising:
stopping motion of said robot in response to predetermined quantities measured by predetermined sensors on said robot reaching predetermined values specified by corresponding ones of said input parameters.

44. The method of claim 43 wherein:
there are plural such predetermined quantities and said stopping stops said robot motion in response to all of said predetermined quantities meeting said predetermined values.

* * * * *